United States Patent
Kimura

(10) Patent No.: US 9,146,388 B2
(45) Date of Patent: Sep. 29, 2015

(54) ZOOM LENS AND IMAGE PICKUP DEVICE INCLUDING THE SAME

(71) Applicant: CANON KABUSHIKI KAISHA, Tokyo (JP)

(72) Inventor: Tomonori Kimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 14/217,726

(22) Filed: Mar. 18, 2014

(65) Prior Publication Data

US 2014/0300782 A1 Oct. 9, 2014

(30) Foreign Application Priority Data

Apr. 9, 2013 (JP) ................................. 2013-081119

(51) Int. Cl.
*G02B 15/00* (2006.01)
*G02B 15/173* (2006.01)
*G02B 15/163* (2006.01)
*G02B 13/00* (2006.01)

(52) U.S. Cl.
CPC ............ *G02B 15/173* (2013.01); *G02B 15/163* (2013.01); *G02B 13/009* (2013.01); *G02B 13/0065* (2013.01)

(58) Field of Classification Search
CPC ............. G02B 13/009; G02B 13/0065; G02B 15/173; G02B 15/14; G02B 15/163
See application file for complete search history.

(56) References Cited

U.S. PATENT DOCUMENTS

| | | | | |
|---|---|---|---|---|
| 7,616,386 B2* | 11/2009 | Kimura | | 359/690 |
| 8,134,783 B2* | 3/2012 | Saito et al. | | 359/684 |
| 8,248,707 B2* | 8/2012 | Kimura et al. | | 359/687 |
| 8,654,447 B2* | 2/2014 | Morooka | | 359/683 |
| 9,019,618 B2* | 4/2015 | Otake | | 359/676 |

FOREIGN PATENT DOCUMENTS

| | | |
|---|---|---|
| JP | H10-020191 A | 1/1998 |
| JP | 2007-279541 A | 10/2007 |
| JP | 2008-191291 A | 8/2008 |

* cited by examiner

*Primary Examiner* — David N Spector
(74) *Attorney, Agent, or Firm* — Carter DeLuca Farrell & Schmidt, LLP

(57) ABSTRACT

A zoom lens includes, in order from the object side to the image plane side, first to fifth lens units having positive, negative, positive, negative and positive refractive powers. At least the second lens unit and the fourth lens unit move during zooming such that at the telephoto end, in comparison with the wide angle end, the interval between the first lens unit and the second lens unit increases, the interval between the second lens unit and the third lens unit decreases, the interval between the third lens unit and the fourth lens unit changes, and the interval between the fourth lens unit and the fifth lens unit increases, and the fifth lens unit does not move. The zoom lens further includes a reflection unit for bending a light path, between the fourth lens unit and the fifth lens unit.

18 Claims, 11 Drawing Sheets

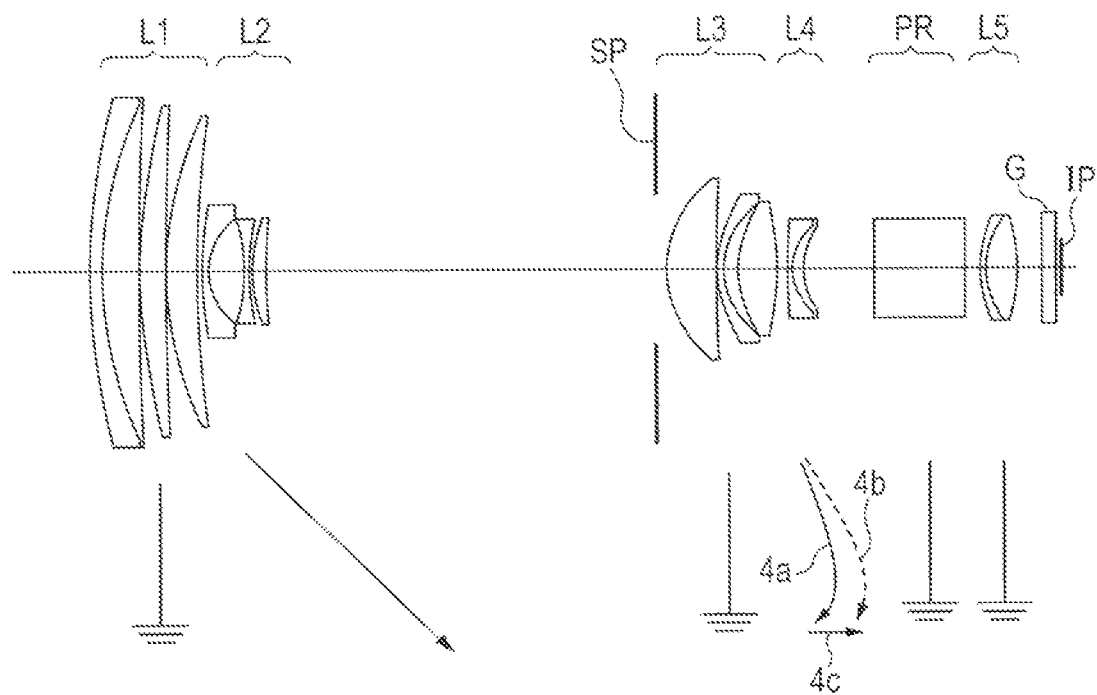
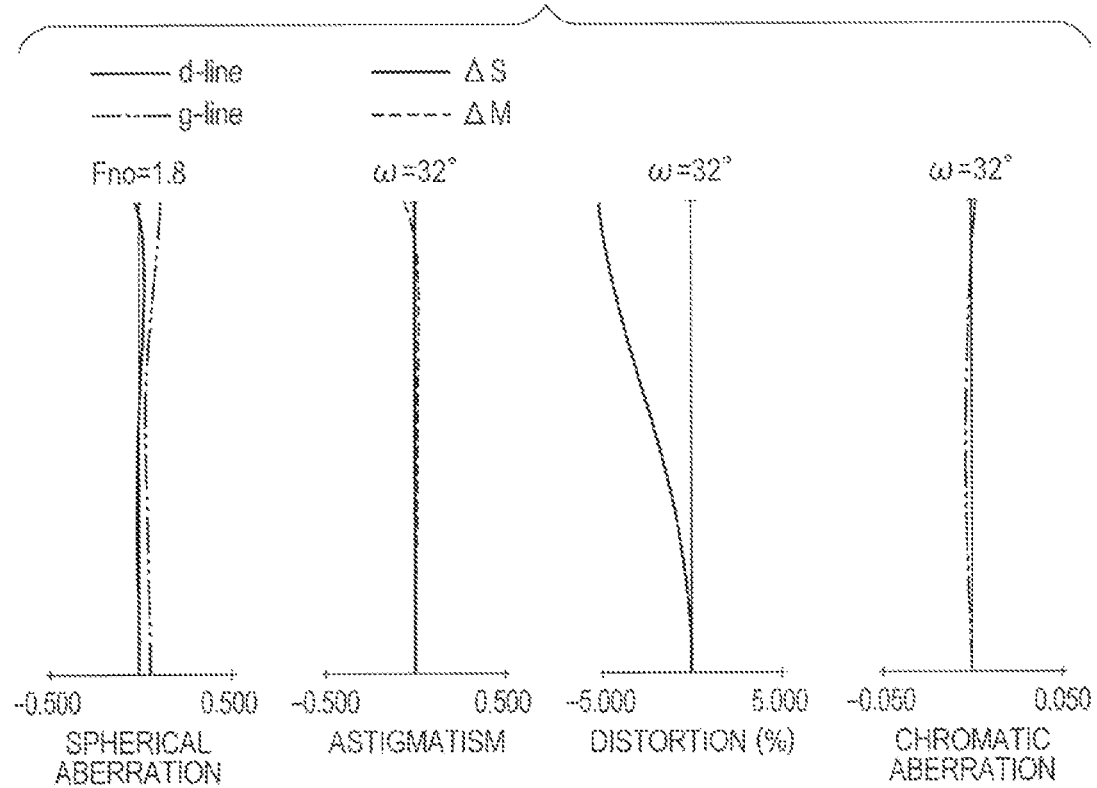

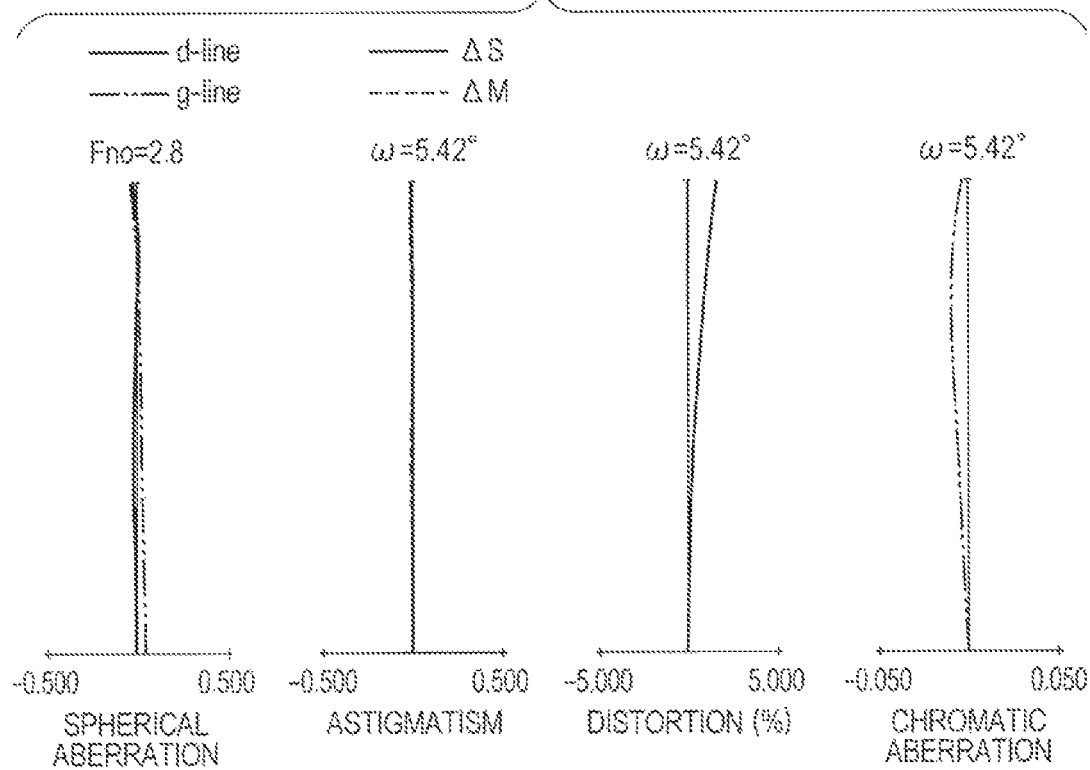
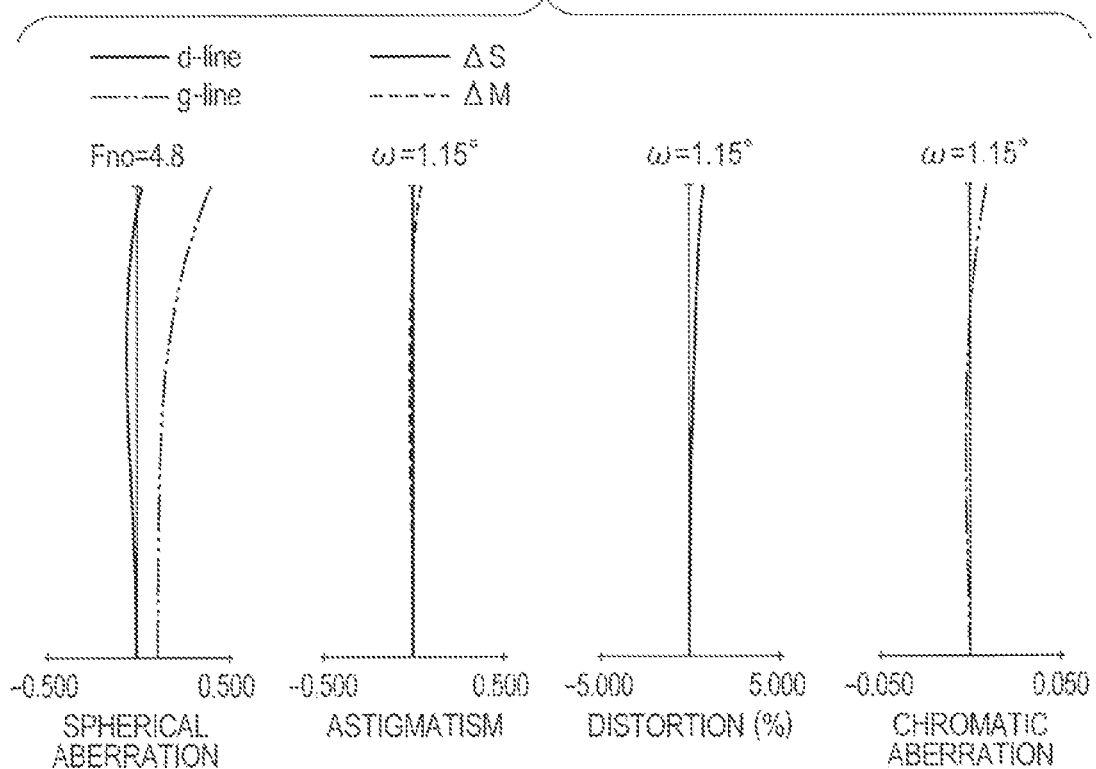

ZOOM LENS AND IMAGE PICKUP DEVICE INCLUDING THE SAME

BACKGROUND OF THE INVENTION

1. Field of the Invention

The present invention relates to a zoom lens and an image pickup device including the same, and is suitable to, for instance, a video camera, a digital still camera, a monitoring camera, a TV camera, and a silver halide photography camera.

2. Description of the Related Art

An imaging optical system included in an image pickup device requires a high zoom ratio, a high optical performance over the entire zoom range, a small size, and a small thickness in the direction of the front and rear of the camera. To reduce the thickness of the camera, a folded zoom lens has been known in which a reflection unit (one of a mirror member and a prism member) that bends the optical axis of an imaging optical system by 90° is arranged on the light path.

Japanese Patent Application Laid-Open No. H10-020191 discloses a zoom lens that includes, in order from an object side to an image side: a first lens unit having a positive refractive power; a second lens unit having a negative refractive power; a third lens unit having a positive refractive power; and a fourth lens unit having a positive refractive power. In this zoom lens, the second lens unit and the fourth lens unit move during zooming, and a reflection unit that bends the light path is arranged between the third lens unit and the fourth lens unit.

Japanese Patent Application Laid-Open No. 2007-279541 discloses a zoom lens that includes, in order from an object side to an image side: a first lens unit having positive refractive power; a second lens unit having a negative refractive power; a third lens unit having a positive refractive power; and a fourth lens unit having a positive refractive power. In this zoom lens, the first lens unit and the third lens unit move during zooming, and a reflection unit for bending the light path is arranged between the second lens unit and the third lens unit.

Japanese Patent Application Laid-Open No. 2008-191291 discloses a zoom lens that includes, in order from an object side to an image side: a first lens unit having a positive refractive power; a second lens unit having a negative refractive power; a third lens unit having a positive refractive power; a fourth lens unit having a negative refractive power; and a fifth lens unit having a positive refractive power. This zoom lens is provided with a reflection unit that bends the light path in one of the first lens unit and the second lens unit.

To achieve a zoom lens that allows the thickness of a camera to be reduced and has a high optical performance over the entire zoom range while achieving a high zoom ratio, it is important to appropriately set the position of the reflection unit in the light path, the lens configuration of the zoom lens, and the refractive power and moving conditions of a variable magnification lens unit.

Conventionally, in many folded zoom lenses, to reduce the thickness of the camera, the reflection unit is arranged on the front side of the lens system (the side near the object). Thus, the dimension in the depth direction of the lens system can be reduced. However, a large space for accommodating a plurality of lens units including a moving lens unit is required in a direction perpendicular to the incident optical axis into the lens system after the reflection unit (image side). It is thus difficult to apply the configuration to an image pickup device having a configuration in which a sufficient space is difficult to be secured.

As such an image pickup device, for instance, a video camera has been known which is held in a state where a palm stands and the fingers wrap the camera. Another example is a monitoring camera including a lens barrel accommodated in a common chassis having a shape like a rectangular parallelepiped for allowing a housing and a pan-tilt drive mechanism to be commonly used among lenses having different specifications.

Thus, to allow a folded zoom lens to be applied to various image pickup devices, and to reduce the thickness in the case of application to a camera, it is important to appropriately select a zoom type and set the position of reflection unit on the light path. If these configurations are inappropriate, various aberrations largely vary during zooming, and it is difficult to achieve a high zoom ratio and reduce the thickness of the entire lens system.

SUMMARY OF THE INVENTION

A zoom lens of the present invention includes, in order from an object side to an image plane side: a first lens unit having a positive refractive power; a second lens unit having a negative refractive power; a third lens unit having a positive refractive power; a fourth lens unit having a negative refractive power; and a fifth lens unit having a positive refractive power, wherein at least the second lens unit and the fourth lens unit move during zooming such that at a telephoto end, in comparison with a wide angle end, an interval between the first lens unit and the second lens unit increases, an interval between the second lens unit and the third lens unit decreases, an interval between the third lens unit and the fourth lens unit changes, and an interval between the fourth lens unit and the fifth lens unit increases, and the fifth lens unit does not move, and the zoom lens further includes a reflection unit for bending a light path, between the fourth lens unit and the fifth lens unit.

Further features of the present invention will become apparent from the following description of exemplary embodiments with reference to the attached drawings.

BRIEF DESCRIPTION OF THE DRAWINGS

FIG. 1 is a lens sectional view at the wide angle end of Embodiment 1 of the present invention.

FIG. 2A is an aberration diagram at the wide angle end of Numerical Example 1 corresponding to Embodiment 1 of the present invention.

FIG. 4B is an aberration diagram at an intermediate zoom position of Numerical Example 2 corresponding to Embodiment 2 of the present invention.

FIG. 4C is an aberration diagram at the telephoto end of Numerical Example 2 corresponding to Embodiment 2 of the present invention.

DESCRIPTION OF THE EMBODIMENTS

Preferred embodiments of the present invention will now be described in detail in accordance with the accompanying drawings.

A zoom lens and an image pickup device including the same of the present invention are hereinafter described. A zoom lens of the present invention includes, in order from an object side to an image plane side: a first lens unit having a positive refractive power; a second lens unit having a negative refractive power; a third lens unit having a positive refractive power; a fourth lens unit having a negative refractive power; and a fifth lens unit having a positive refractive power.

In comparison with the wide angle end, at the telephoto end, the interval between the first lens unit and the second lens unit increases, the interval between the second lens unit and the third lens unit decreases, and the interval between the third lens unit and the fourth lens unit varies. Furthermore, at least the second lens unit and the fourth lens unit move during zooming so as to increase the interval between the fourth lens unit and the fifth lens unit. The fifth lens unit does not move. A reflection unit for bending the light path is provided between the fourth lens unit and the fifth lens unit.

Figure 2B:
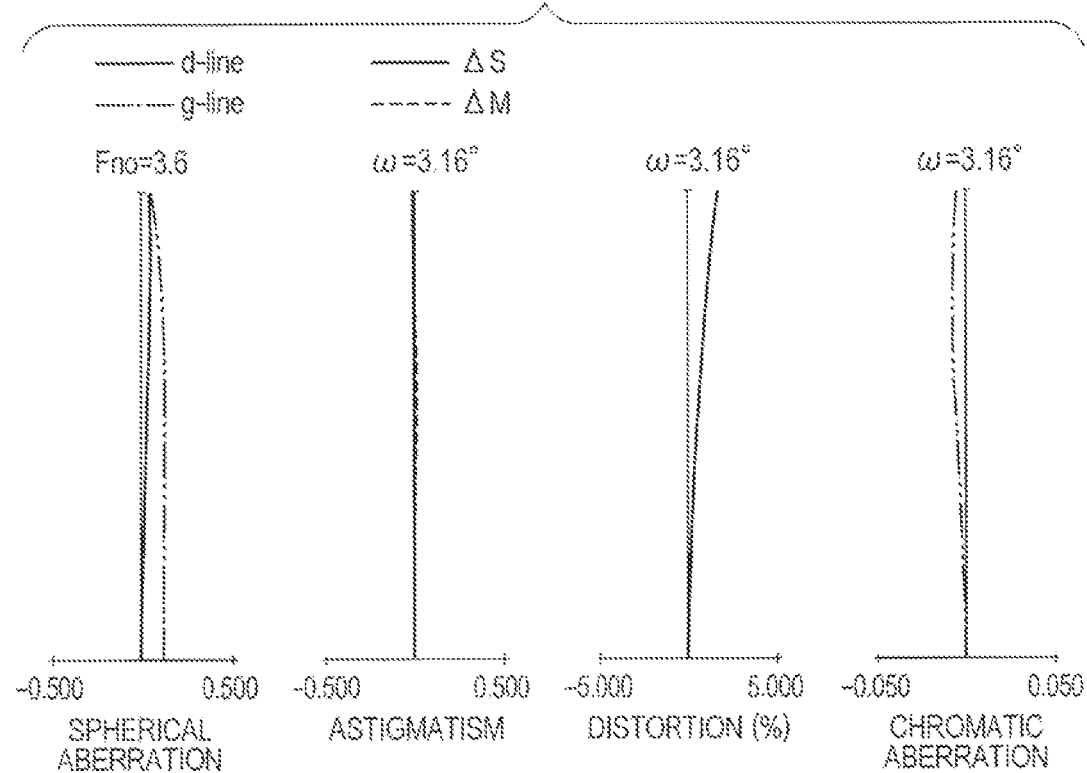
FIG. 2B is an aberration diagram at an intermediate zoom position of Numerical Example 1 corresponding to Embodiment 1 of the present invention.
Figure 2C:
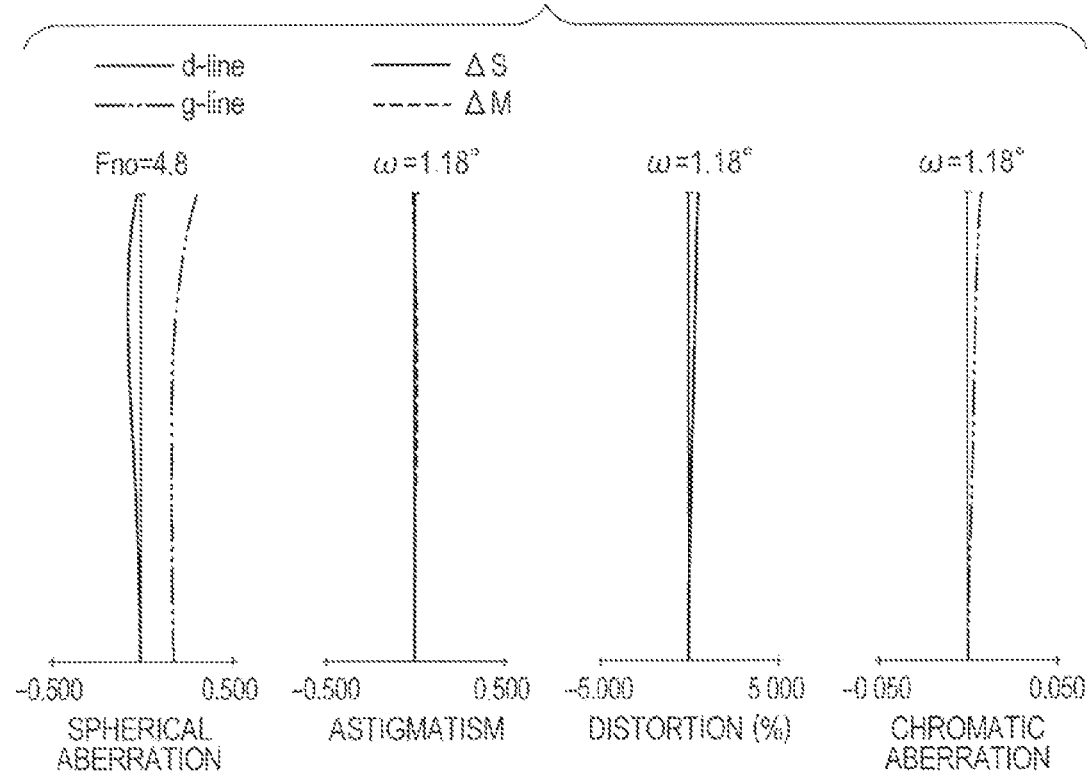
FIG. 2C is an aberration diagram at the telephoto end of Numerical Example 1 corresponding to Embodiment 1 of the present invention.
Figure 3:
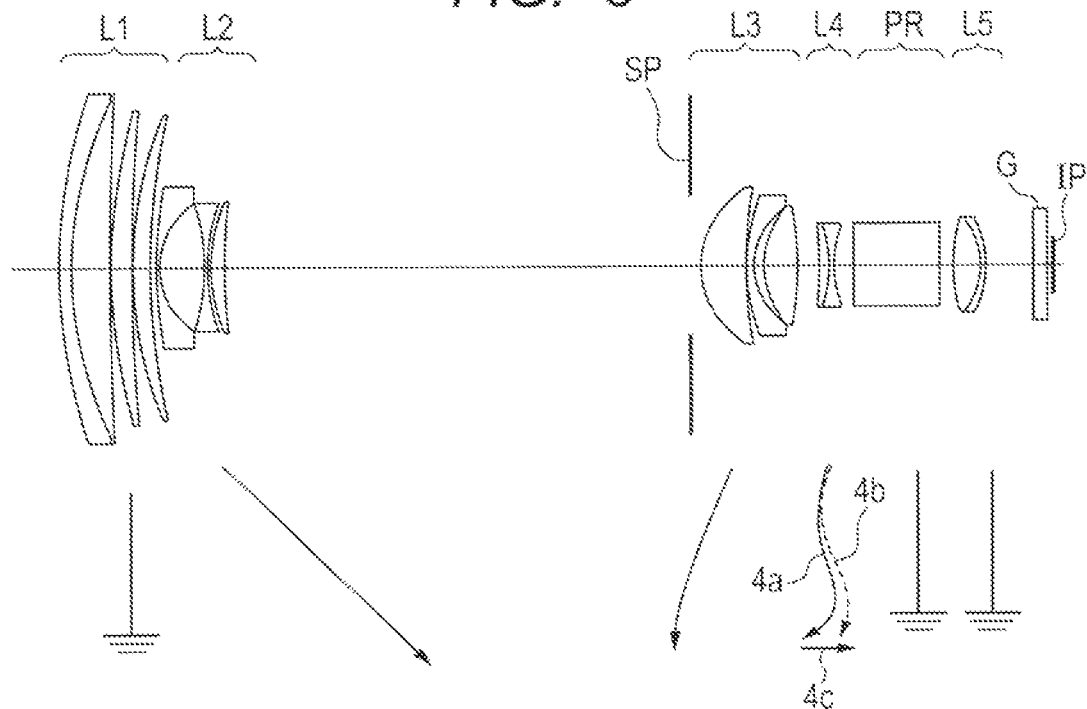
FIG. 3 is a lens sectional view at the wide angle end of Embodiment 2 of the present invention.
Figure 4A:
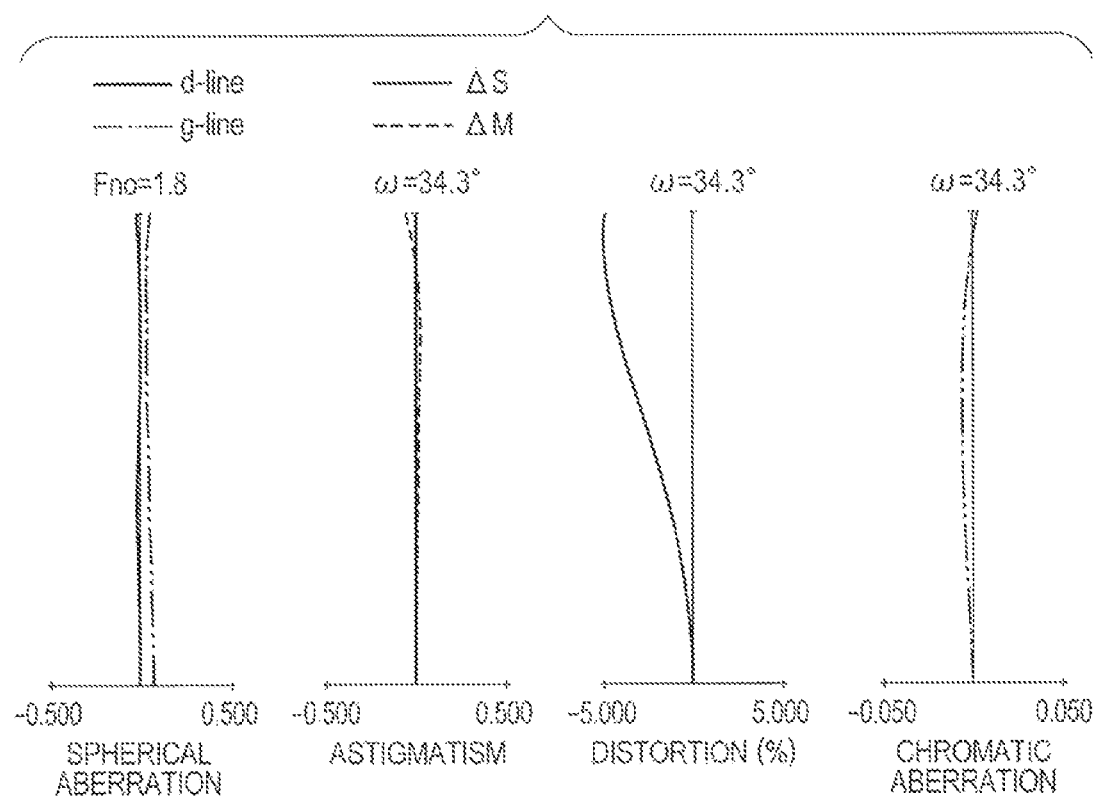
FIG. 4A is an aberration diagram at the wide angle end of Numerical Example 2 corresponding to Embodiment 2 of the present invention.

FIG. 1 is a lens sectional view at the wide angle end (short focal length end) of a zoom lens of Embodiment 1 of the present invention. FIGS. 2A, 2B and 2C are aberration diagrams of the zoom lens of Embodiment 1 at the wide angle end, an intermediate zoom position and the telephoto end (long focal length end), respectively. FIG. 3 is a lens sectional view of a zoom lens of Embodiment 2 of the present invention at the wide angle end. FIGS. 4A, 4B and 4C are aberration diagrams of the zoom lens of Embodiment 2 at the wide angle end, an intermediate zoom position and the telephoto end, respectively.

Figure 5:
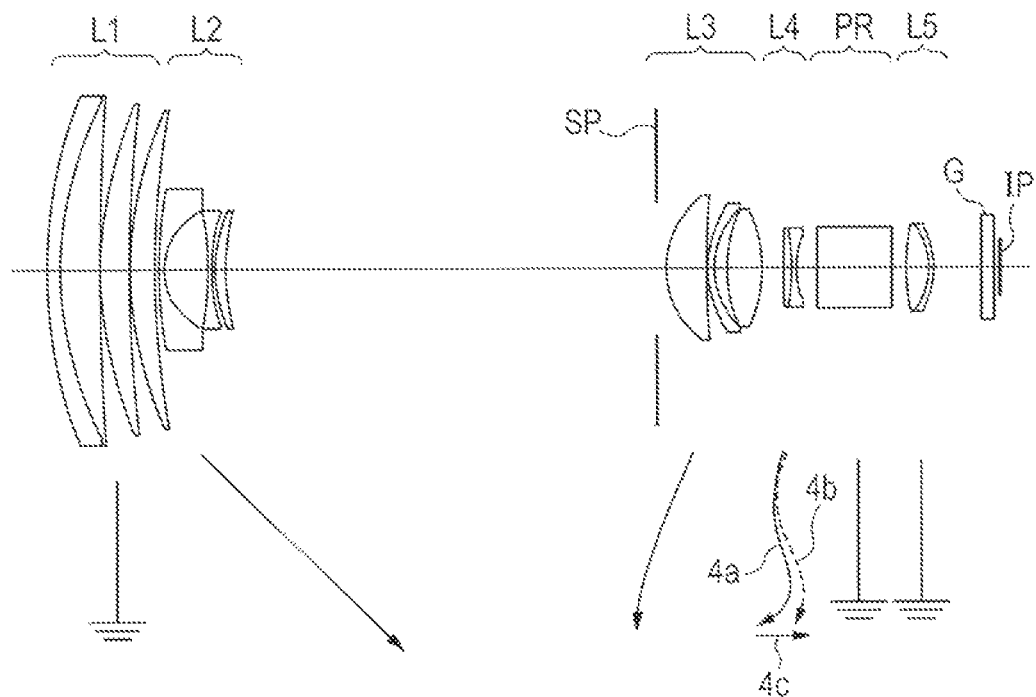
FIG. 5 is a lens sectional view at the wide angle end of Embodiment 3 of the present invention.
Figure 6A:
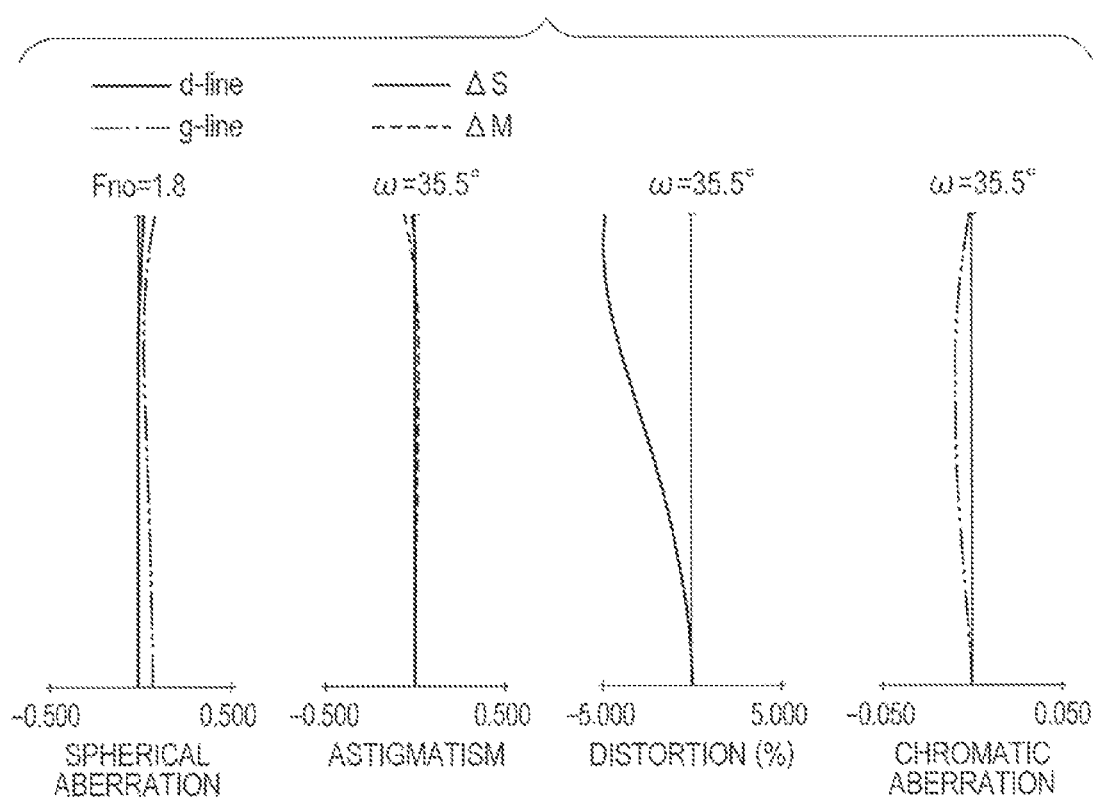
FIG. 6A is an aberration diagram at the wide angle end of Numerical Example 3 corresponding to Embodiment 3 of the present invention.
Figure 6B:
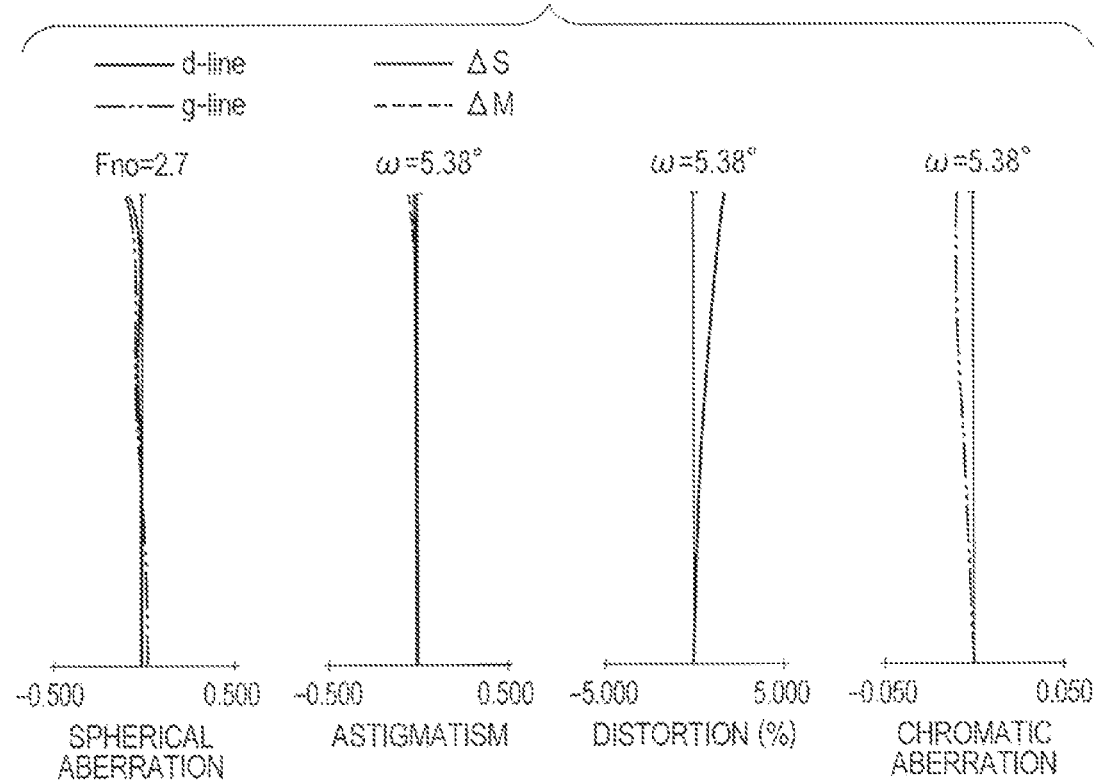
FIG. 6B is an aberration diagram at an intermediate zoom position of Numerical Example 3 corresponding to Embodiment 3 of the present invention.
Figure 6C:
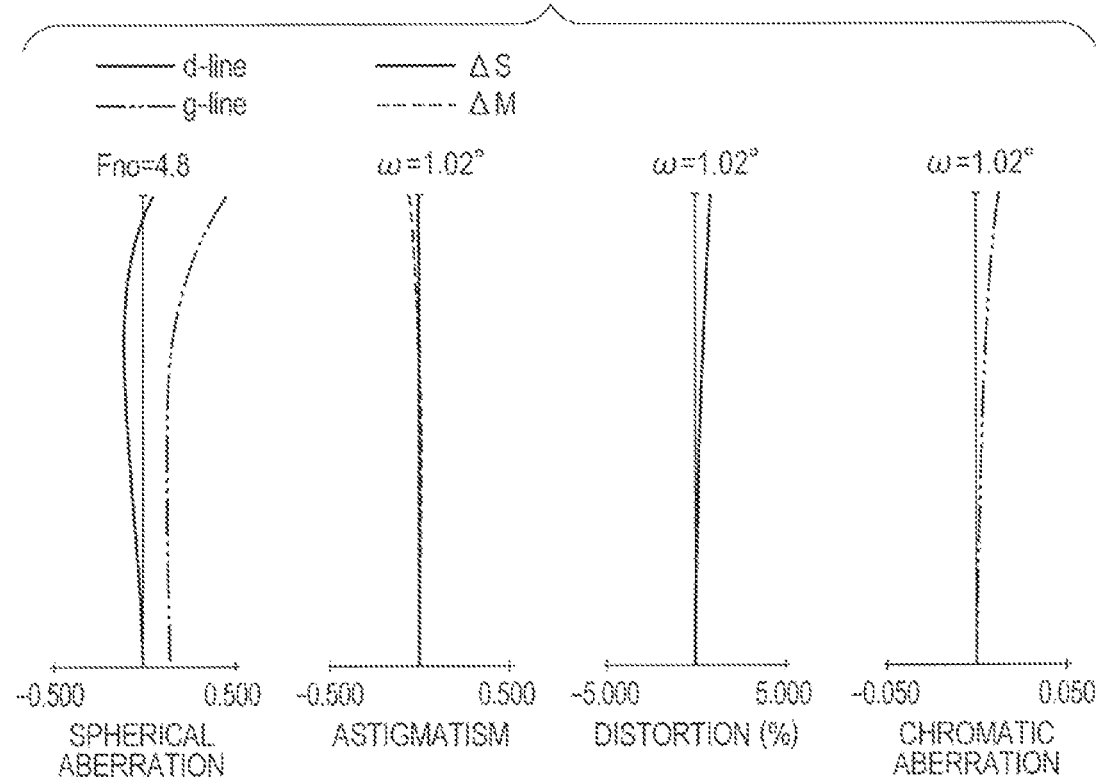
FIG. 6C is an aberration diagram at the telephoto end of Numerical Example 3 corresponding to Embodiment 3 of the present invention.
Figure 7:
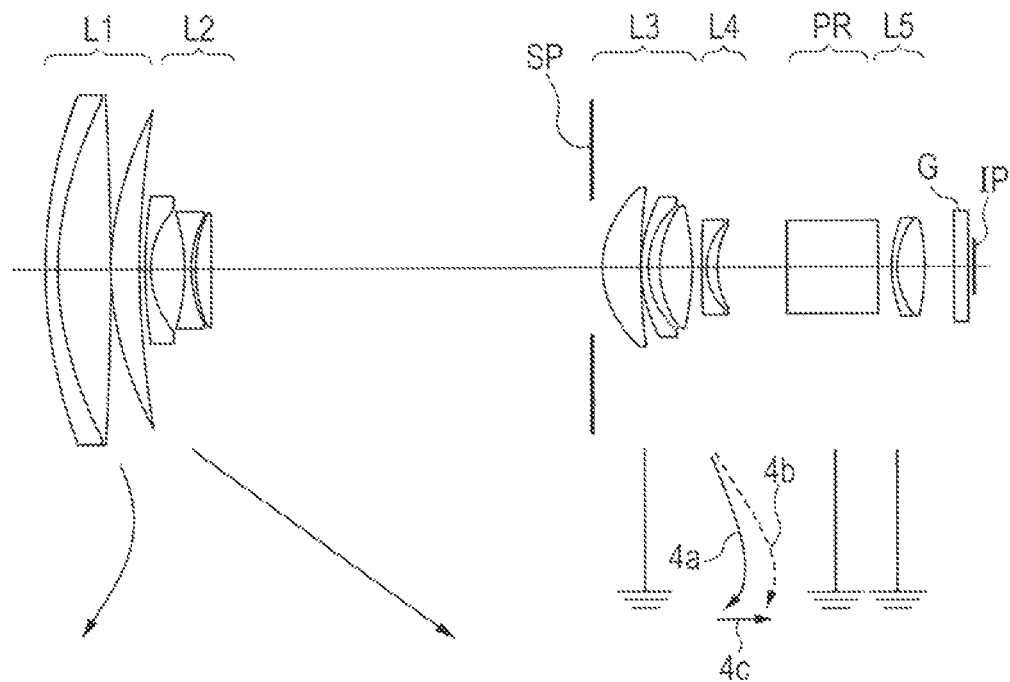
FIG. 7 is a lens sectional view at the wide angle end of Embodiment 4 of the present invention.
Figure 8A:
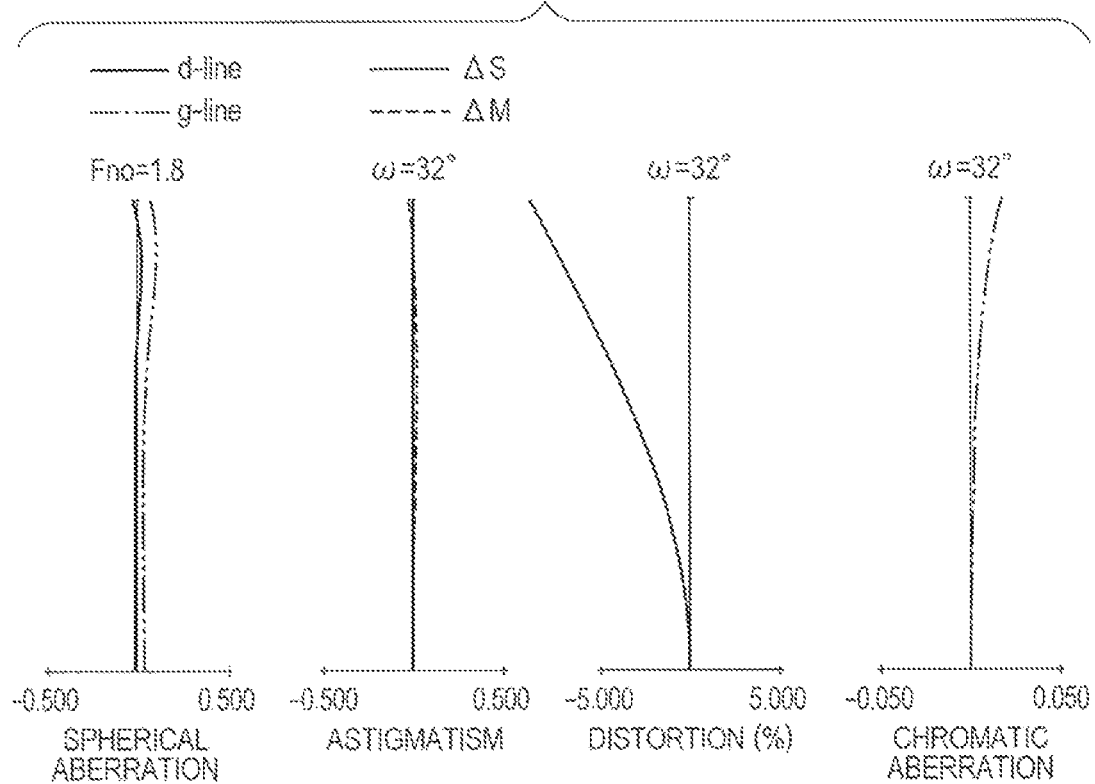
FIG. 8A is an aberration diagram at the wide angle end of Numerical Example 4 corresponding to Embodiment 4 of the present invention.
Figure 8B:
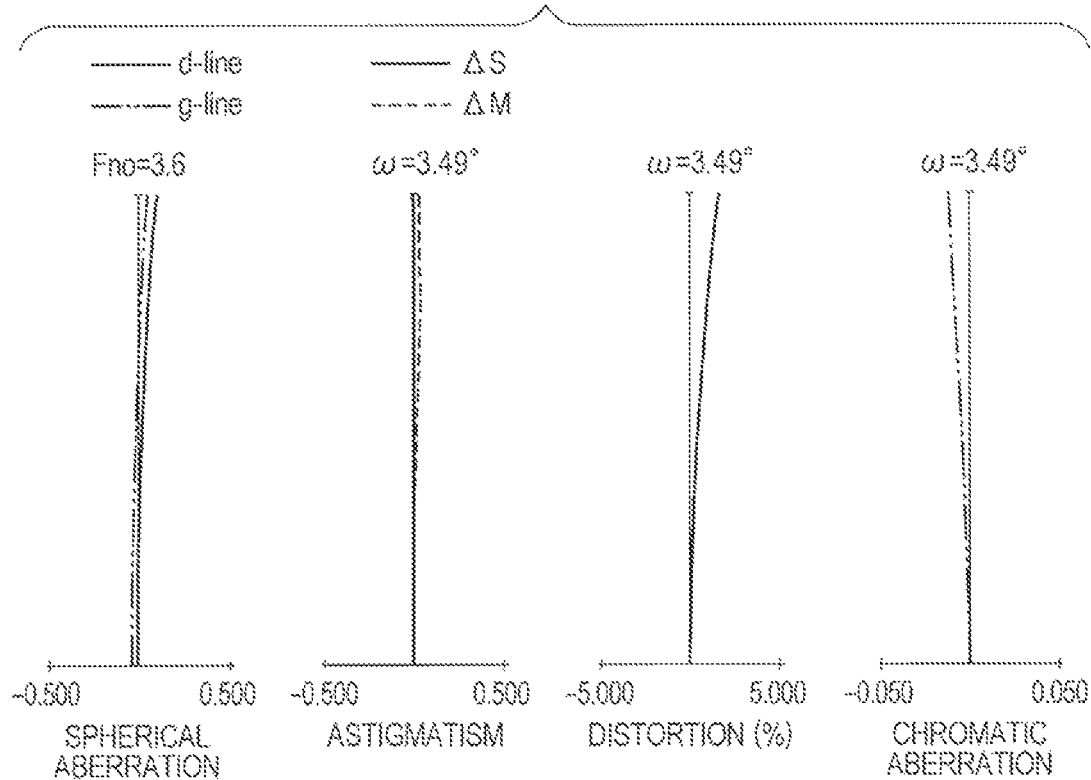
FIG. 8B is an aberration diagram at an intermediate zoom position of Numerical Example 4 corresponding to Embodiment 4 of the present invention.
Figure 8C:
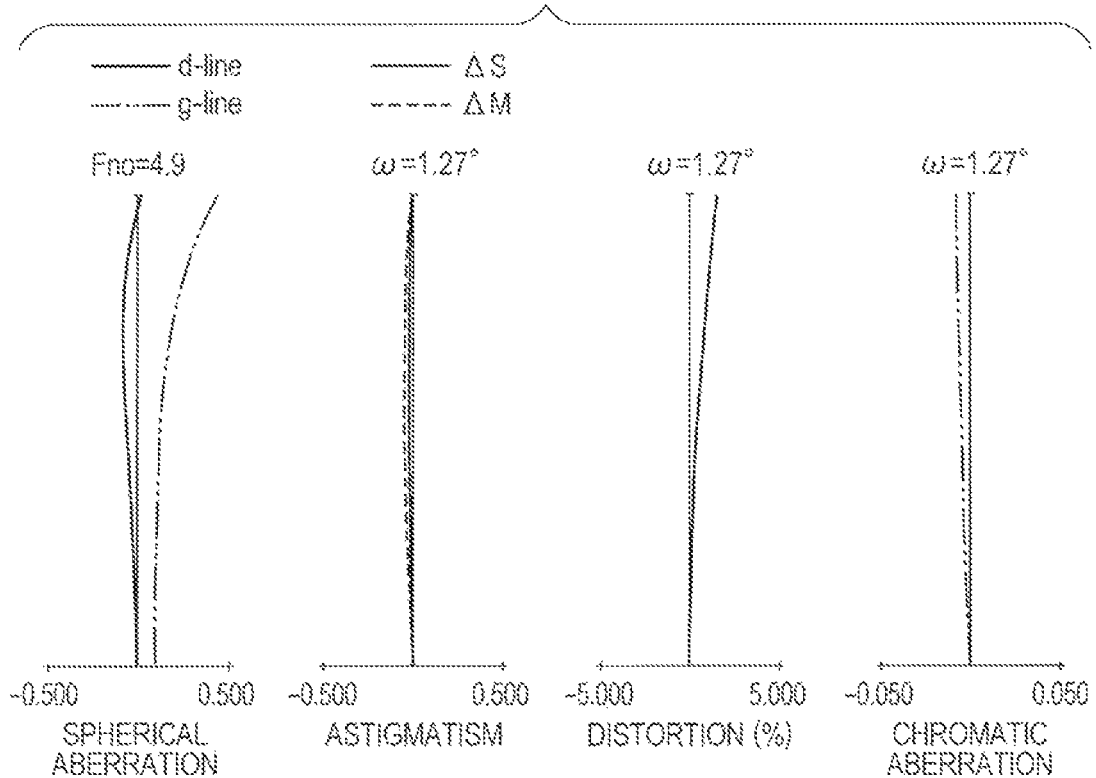
FIG. 8C is an aberration diagram at the telephoto end of Numerical Example 4 corresponding to Embodiment 4 of the present invention.
Figure 9:
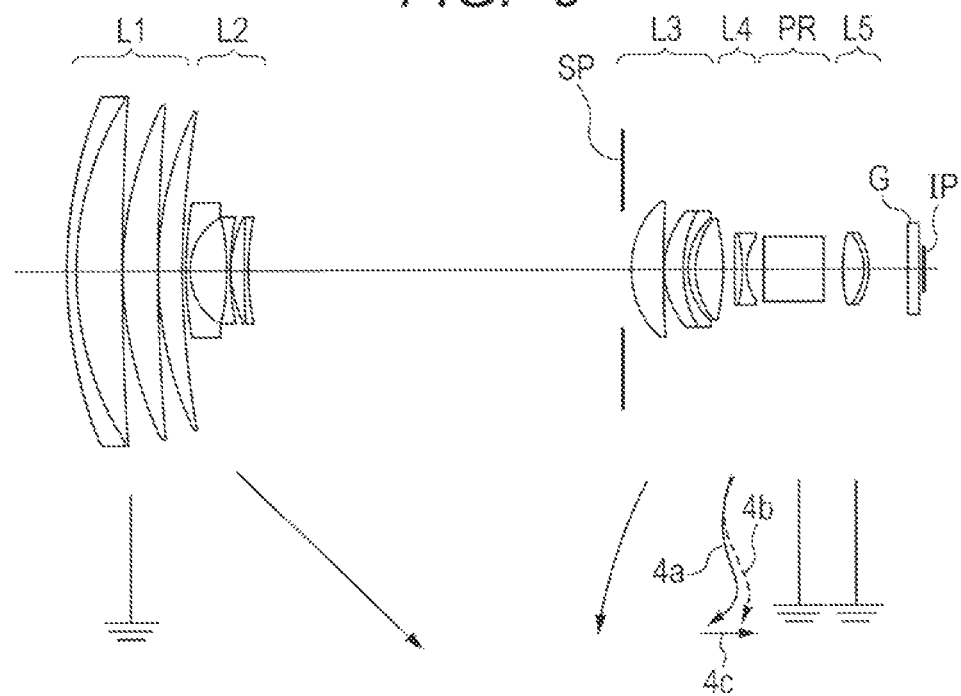
FIG. 9 is a lens sectional view at the wide angle end of Embodiment 5 of the present invention.
Figure 10A:
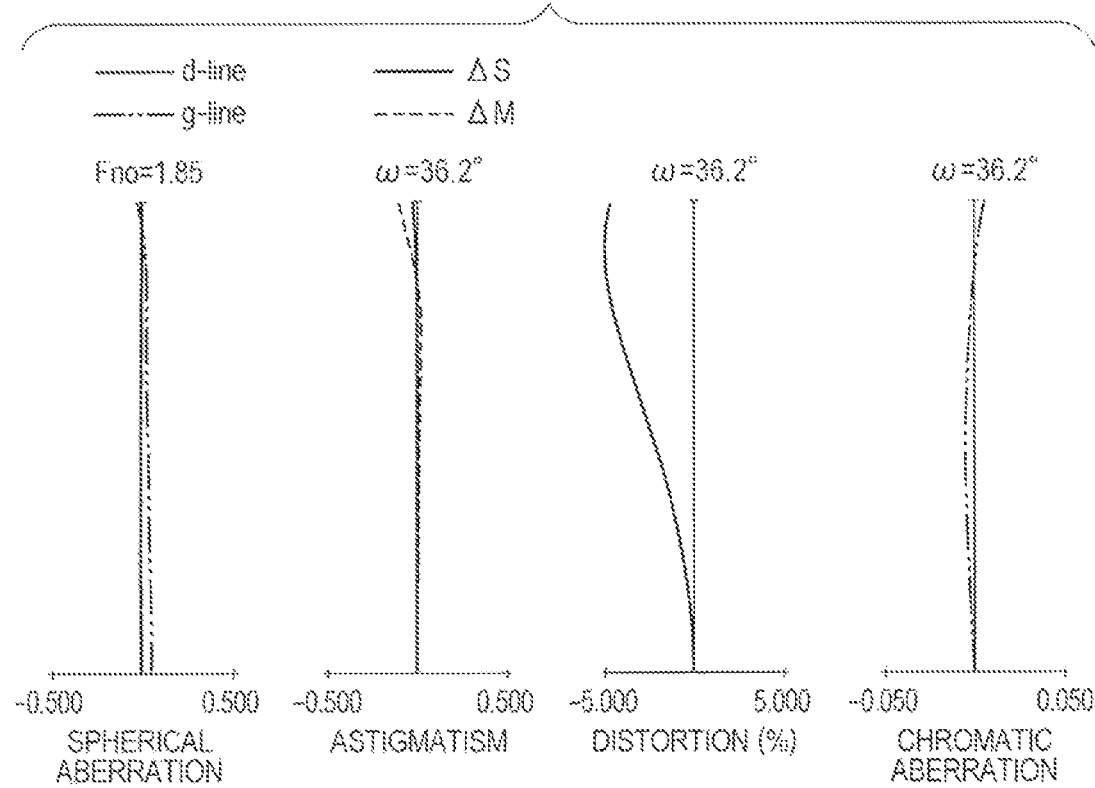
FIG. 10A is an aberration diagram at the wide angle end of Numerical Example 5 corresponding to Embodiment 5 of the present invention.
Figure 10B:
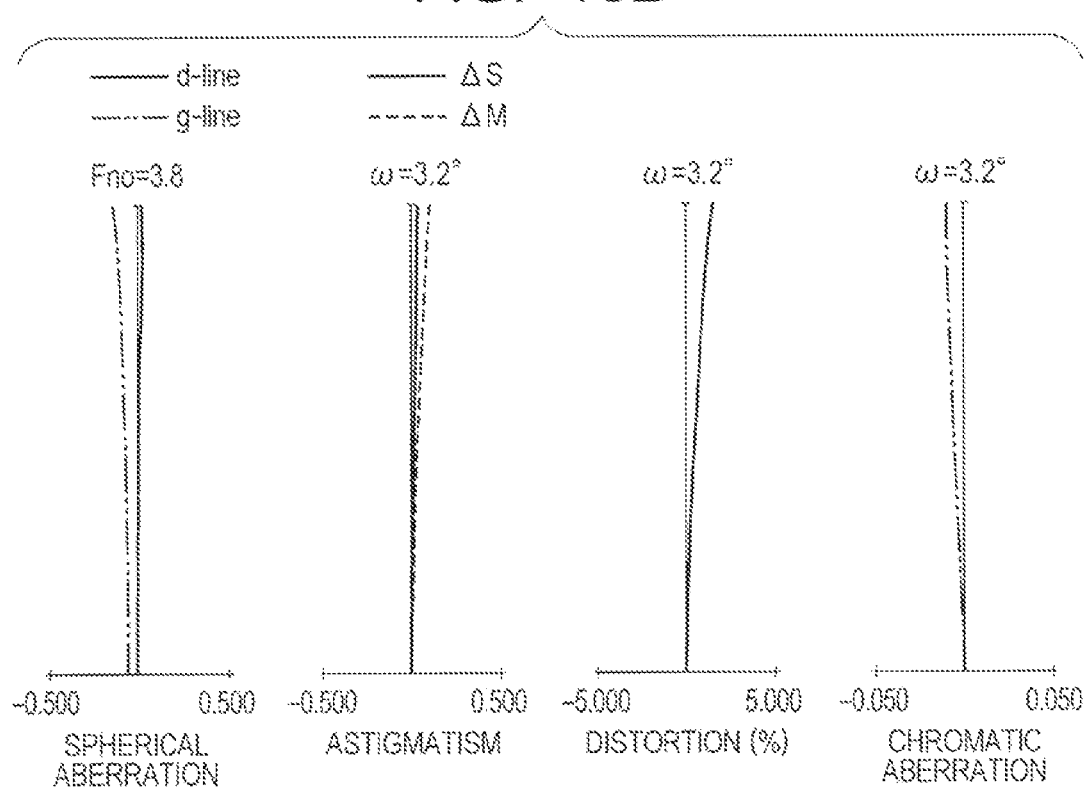
FIG. 10B is an aberration diagram at an intermediate zoom position of Numerical Example 5 corresponding to Embodiment 5 of the present invention.
Figure 10C:
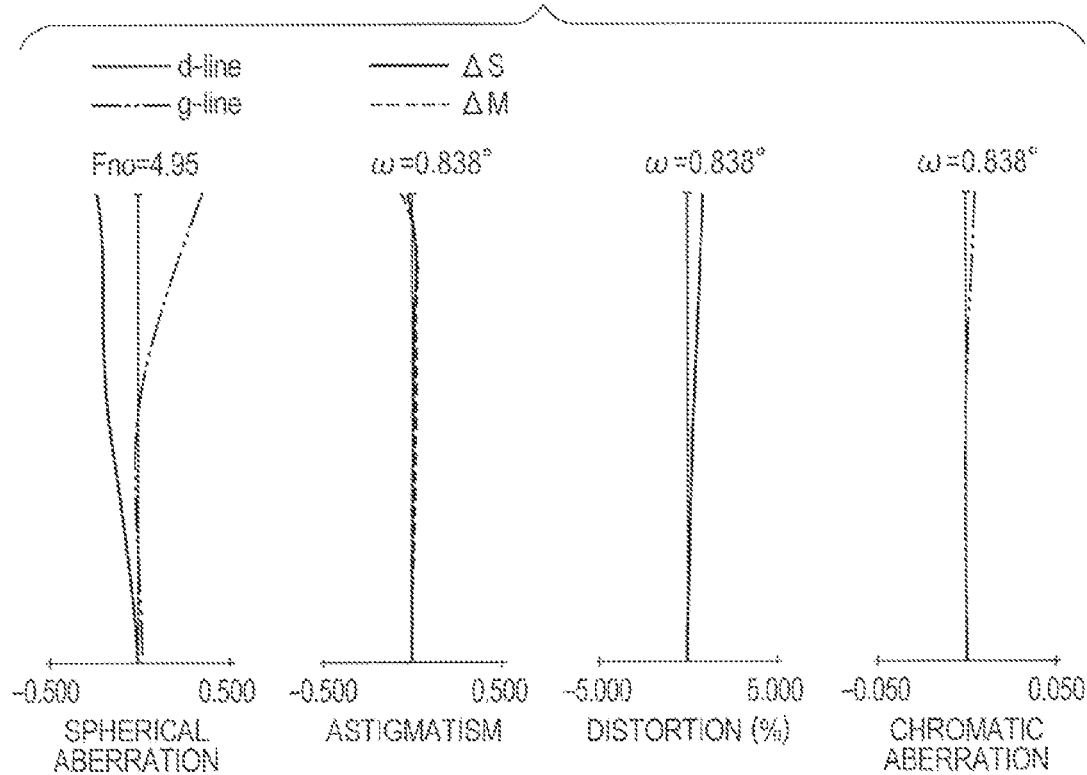
FIG. 10C is an aberration diagram at the telephoto end of Numerical Example 5 corresponding to Embodiment 5 of the present invention.

FIG. 5 is a lens sectional view of a zoom lens of Embodiment 3 of the present invention at the wide angle end. FIGS. 6A, 6B and 6C are aberration diagrams of the zoom lens of Embodiment 3 at the wide angle end, an intermediate zoom position and the telephoto end, respectively. FIG. 7 is a lens sectional view of a zoom lens of Embodiment 4 of the present invention at the wide angle end. FIGS. 8A, 8B and 8C are aberration diagrams of the zoom lens of Embodiment 4 at the wide angle end, an intermediate zoom position and the telephoto end, respectively. FIG. 9 is a lens sectional view of a zoom lens of Embodiment 5 of the present invention at the wide angle end. FIGS. 10A, 10B and 10C are aberration diagrams of the zoom lens of Embodiment 5 at the wide angle end, an intermediate zoom position and the telephoto end, respectively.

Each embodiment adopts an internal reflection prism as a reflection unit. The light path is bent by 90 degrees by an inner reflection surface provided in the prism. However, each lens sectional view illustrates a state where the light path is unfolded for the sake of convenience.

Figure 11:
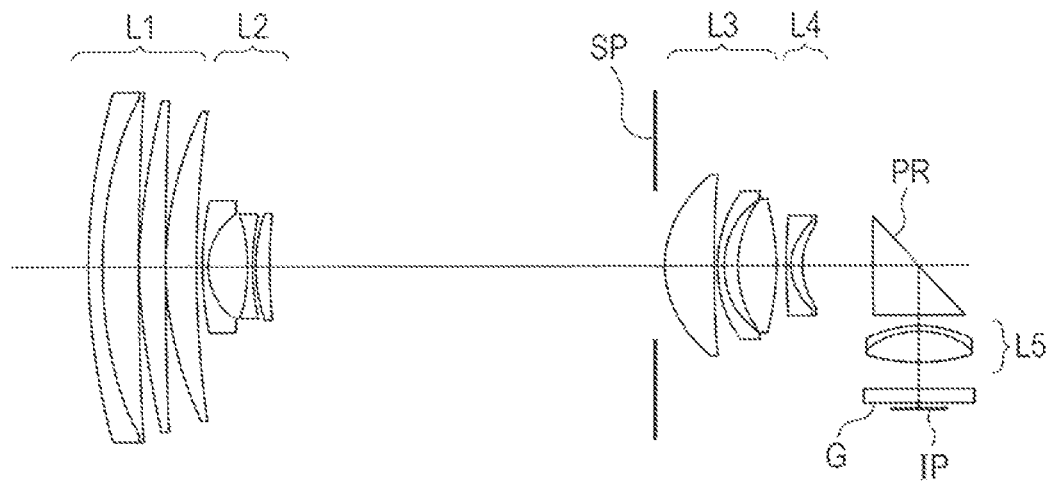
FIG. 11 is a lens sectional view of a zoom lens of Embodiment 1 of the present invention.
Figure 12:
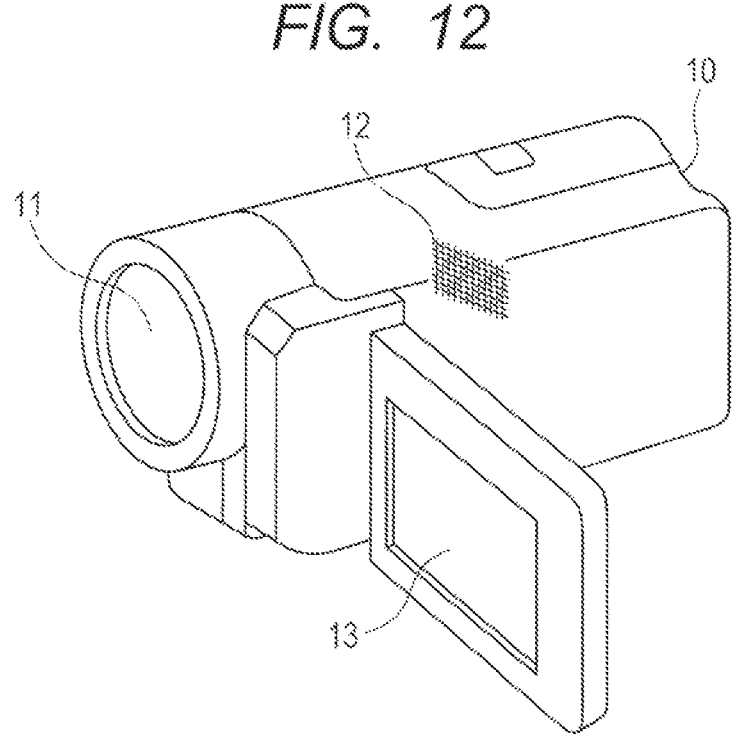
FIG. 12 is a principal schematic diagram of an image pickup device of the present invention.

FIG. 11 is a lens sectional view in the case where the light path is bent by 90 degrees by the inner reflection surface of the reflection unit (prism) in Embodiment 1 of the present invention. FIG. 12 is a principal schematic diagram of a camera (image pickup device) including a zoom lens of the present invention. The zoom lens of each embodiment is an imaging lens system included in an image pickup device (camera), such as a video camera, a digital camera or a silver halide film camera.

In the lens sectional view, the left direction represents a subject side (object side) (front), and the right direction represents an image side (rear). In the lens sectional view, i indicates the order of a lens unit from the object side. Li indicates the i-th lens unit. An aperture stop SP regulates the F-number light flux. A reflection unit PR is a prism that includes an inner reflection surface, is on the light path and bends the light path by 90 degrees or thereabouts (±10 degrees). The reflection unit PR may be a reflection mirror instead of the prism. An optical block G corresponds to an optical filter, a faceplate, a quartz low-pass filter and an infrared cut filter.

On an image plane IP, an image pickup plane of a solid image pickup element (photo-electric conversion element), such as a CCD sensor or a CMOS sensor, is disposed in the case of being used as an imaging optical system of any of a video camera and a digital still camera, or a photosensitive surface corresponding to the film surface is disposed in the case of a silver halide film camera. In spherical aberration diagrams among aberration diagrams, a solid line d and an alternate long and two short dashes line g represent a d-line and a g-line, respectively. In astigmatism diagrams, a broken line ΔM and a solid line ΔS represent a meridional image plane and a sagittal image plane, respectively.

The lateral chromatic aberration is represented by the g-line. The half angle of view ω (half a value of the imaging angle of view) (degree) and the F-number Fno are also illustrated. In each embodiment, the wide angle end and the telephoto end are zoom positions when a variable magnification lens unit is disposed at the respective ends of a mechanically movable range on the optical axis.

The zoom lens of the present invention includes, in order from the object side to the image side: a first lens unit L1 having a positive refractive power; a second lens unit L2 having a negative refractive power; a third lens unit L3 having a positive refractive power; a fourth lens unit L4 having a negative refractive power; and a fifth lens unit L5 having a positive refractive power.

During zooming from the wide angle end to the telephoto end, as indicated by an arrow, at least the second lens unit L2 moves toward the image and the fourth lens unit L4 nonlinearly moves, thus performing zooming. A curve 4a of a solid line and a curve 4b of a broken line, which pertain to the fourth lens unit L4, represent movement loci for correcting image plane variation due to variation in magnification in the cases of being focused at infinity and a short distance, respectively. A rear focus system that moves the fourth lens unit L4 on the optical axis to perform focusing is adopted. At the telephoto end, for focusing from infinity to a short distance, the fourth lens unit L4 is shifted backward as indicated by an arrow 4c.

This configuration achieves a high zoom ratio while reducing the size of the entire system. For instance, in comparison with a four-group zoom lens that includes first to fourth lens units having a positive, negative, positive and positive refractive powers, the present invention arranges the lens unit having a negative refractive power exerting a diverging effect, nearer to the image plane than the aperture stop. This configuration particularly facilitates reduction in the size of the front lens effective diameter, and increases flexibility for correcting aberrations to thereby facilitate achievement of a high zoom ratio.

In each embodiment, at least the second lens unit L2 and the fourth lens unit L4 are moved to achieve zooming. Here, the interval between the first lens unit L1 and the second lens unit L2 becomes wider and the interval between the second lens unit L2 and the third lens unit L3 becomes narrower at the telephoto end than at the wide angle end; the interval between the third lens unit L3 and the fourth lens unit L4 varies, and the interval between the fourth lens unit L4 and the fifth lens unit L5 increases accordingly. The fifth lens unit L5 does not move during zooming. The fifth lens unit L5 having a positive refractive power is thus arranged nearer to the object than the image plane, thereby improving telecentricity.

The reflection unit PR for bending the light path is provided between the fourth lens unit L4 and the fifth lens unit L5. The reflection unit PR bends the light path by 90° or therearound, thereby reducing the size in the incident optical axis direction into the lens system. Pertaining to paraxial refractive power arrangement, increase in the interval between the fourth lens unit L4 and the fifth lens unit L5 can reduce the refractive powers of the third lens unit L3, the fourth lens unit L4 and the fifth lens unit L5, thereby facilitating aberration correction.

Thus, the interval between the fourth lens unit L4 and the fifth lens unit L5 on the optical axis is increased, and the reflection unit PR is arranged in the space thereof, thereby achieving a high zoom ratio and reduction in the size of the zoom lens. The fourth lens unit L4 having a negative refractive power is arranged between the third lens unit L3 having a positive refractive power and the fifth lens unit L5 having a positive refractive power, thereby suppressing low the incident height of on-axis light flux passing proximity to the fourth lens unit L4 and the incident height of off-axis light flux into the lens surface.

This arrangement reduces the effective diameter of the reflection unit PR, and facilitates reduction in size of the entire system. The reflection unit PR may be one of the prism having an inner reflection surface and a mirror. A small prism or a small mirror can achieve high surface accuracy and angular accuracy easier than a large element. The fifth lens unit L5 and the image pickup plane are arranged in a direction perpendicular or substantially perpendicular to the incident optical axis of the zoom lens on a side nearer to the image than the reflection member PR. These components have relatively small effective diameters, which allow the space in the optical axis of the zoom lens to be small.

Meanwhile, the light path length in a direction perpendicular or substantially perpendicular to the incident optical axis of the zoom lens is addition of the thickness of the fifth lens unit L5 in the optical axis direction and front and rear intervals thereof, which negates the need of a large space. The outer diameter of a lens barrel of a zoom lens of a five-group configuration zoom type according to the present invention is defined by the front lens effective diameter of the first lens unit L1 that has the largest effective diameter, in many cases.

According to the present invention, the protrusion of the lens barrel in a direction perpendicular to the incident optical axis of the zoom lens can be easily suppressed small. In each embodiment, during focusing from infinity to a short distance, the fourth lens unit having a negative refractive power is moved toward the image plane, as indicated by the arrow 4c. The light weight fourth lens unit L4 is adopted as the focusing lens unit, thereby facilitating quick focusing.

According to the present invention, the foregoing configuration achieves the zoom lens that is small in size of the entire system and has a high zoom ratio, and achieves high optical performance over the entire zoom range. In each embodiment, it is appropriate to achieve at least one of the following conditions.

The focal lengths fw and ft of the entire system are at the wide angle end and the telephoto end, respectively. The focal lengths f1, f2, f3, f4 and f5 are of the first lens unit L1, the second lens unit L2, the third lens unit L3, the fourth lens unit L4 and the fifth lens unit L5, respectively. The minimum value of the interval between the fourth lens unit L4 and the fifth lens unit L5 during zooming from the wide angle end to the telephoto end is D45min. Here, the fourth lens unit L4 for focusing is at a position for focusing on infinity. In the case where the reflection prism PR is a prism member, the interval between the exit surface of the reflection unit PR and the image plane is Dpi, and the total lens length (the distance from the first lens surface to the image plane) at the telephoto end is Lt.

Here, in the case where the reflection unit is a prism member, the interval Dpi is the distance from the exit surface of the prism member to the image plane. In the case where the reflection unit is a mirror, this interval is the distance to the image plane from the point of intersection of the perpendicular line from the end of the effective reflection surface of the mirror on the image side with the optical axis. The radius Ymax is for the maximum effective image diameter among the effective image diameters at the respective zoom positions formed by the zoom lens. The amount of movement m2 is of the second lens unit L2 during zooming from the wide angle end to the telephoto end.

Here, the amount of movement of a lens unit during zooming from the wide angle end to the telephoto end is the difference between positions of the lens unit in the optical axis direction at the wide angle end and the telephoto end. The sign of the difference of positions is positive in the case where the lens unit is disposed nearer to the image at the telephoto end than at the wide angle end; the sign is negative in the case of disposition nearer to the object at the telephoto end than at the wide angle end. The transverse magnifications β2w and β2t are of the second lens unit L2 at the wide angle end and the telephoto end, respectively. The second lens unit L2 includes at least one positive lens. The material of at least one positive lens thereamong has an Abbe number vd2 for d-line. Here, it is appropriate to satisfy at least one of the following conditional expressions.

$$0.8 < -f3/f4 < 1.5 \quad (1)$$

$$0.02 < -f4/ft < 0.12 \quad (2)$$

$$0.4 < f3/f5 < 1.1 \quad (3)$$

$$2.0 < D45\text{min}/fw < 3.5 \quad (4)$$

$$0.03 < Dpi/Lt < 0.40 \quad (5)$$

$$0.03 < Y\text{max}/|m2| < 0.15 \quad (6)$$

$$0.02 < -f2/ft < 0.07 \quad (7)$$

$$8.0 < f1/fw < 20.0 \quad (8)$$

$$20 < \beta2t/\beta2w < 70 \quad (9)$$

$$0.40 < -f4/f5 < 0.95 \quad (10)$$

$$0.06 < f5/ft < 0.15 \quad (11)$$

$$10.0 < vd2 < 20.0 \quad (12)$$

Next, the technical meaning of the foregoing conditional expression is described. The conditional expression (1) defines refractive power allocation between the third lens unit L3 having the positive refractive power and the fourth lens unit L4 having the negative refractive power that are arranged nearer to the object than the reflection unit PR. If the absolute value of the focal length of the fourth lens unit L4 becomes too low (the negative refractive power becomes strong) exceeding the upper limit of the conditional expression (1) in comparison with the absolute value of the focal length of the third lens unit L3, the diverging effect on off-axial rays becomes strong. Accordingly, the incident height of off-axial rays on the reflection unit PR increases. Thus, the effective diameter required for the reflection unit PR becomes too large, which increases the size of the entire system.

In contrast, if the absolute value of the focal length of the fourth lens unit L4 becomes too high (the negative refractive power become weak) falling short of the lower limit of the conditional expression (1) in comparison with the absolute value of the focal length of the third lens unit L3, the positional sensitivity during image plane correction and focusing due to variation in magnification of the fourth lens unit L4 becomes low. As a result, the movement stroke of the fourth lens unit L4 during zooming and focusing becomes too large, and the space against the reflection unit PR is required to be preliminarily secured large accordingly, which makes reduction in the total lens length difficult.

The conditional expression (2) defines the negative refractive power of the fourth lens unit L4. If the absolute value of the focal length of the fourth lens unit L4 becomes too high (the negative refractive power becomes weak) exceeding the upper limit of the conditional expression (2), the movement stroke during zooming and focusing of the fourth lens unit L4 becomes large. Accordingly, the interval with the reflection unit PR is required to be preliminarily secured large, which increases the size of the total lens length. In contrast, if the absolute value of the focal length of the fourth lens unit L4 becomes too low (the negative refractive power becomes strong) falling short of the lower limit of the conditional expression (2), variation in various aberrations, such as lateral chromatic aberration, image plane curvature and astigmatism, due to focusing becomes large.

The conditional expression (3) defines refractive power allocation between the third lens unit L3 having the positive refractive power and the fifth lens unit L5 having the positive refractive power that are arranged nearer to the image than the aperture stop SP. The third lens unit L3 is a lens unit arranged nearer to the image than but adjacent to the aperture stop SP. Accordingly, this group has charge of correcting aberrations of both the on-axis rays and off-axial rays. Meanwhile, the fifth lens unit L5 is a lens unit arranged nearer to the object than but adjacent to the image plane. Accordingly, across the entire zoom range, off-axial rays pass through a higher position than on-axis rays do. Accordingly, the fifth lens unit L5 substantially serves as a field lens for the image plane.

If the refractive power allocation of the fifth lens unit L5 becomes much higher than the allocation of the third lens unit L3 exceeding the upper limit of the conditional expression (3), the converging effect on off-axial rays becomes too strong across the entire zoom range, and the exit pupil position moves toward the image plane. Accordingly, the telecentricity is reduced. The reduction in telecentricity largely varies the incident angle on the photo-electric conversion element arranged on the image plane according to the image height (angle of view). This variation tends to cause unevenness in illumination and color shading in an output image.

In contrast, if the refractive power allocation of the third lens unit L3 becomes much higher than the allocation of the fifth lens unit L5 falling short of the lower limit of the conditional expression (3), the third lens unit L3 causes large on-axis chromatic aberration, spherical aberration, image plane curvature and astigmatism. It is difficult to correct these aberrations using the other lens units.

The conditional expression (4) defines the interval between the fourth lens unit L4 and the fifth lens unit L5 during zooming. If the interval becomes too large exceeding the upper limit of the conditional expression (4), the refractive powers of the fourth lens unit L4 and the fifth lens unit L5 can be weakened, which is advantageous for aberration correction. However, the total lens length becomes large. In contrast, if the interval becomes small falling short of the lower limit of the conditional expression (4), the refractive powers of the fourth lens unit L4 and the fifth lens unit L5 become strong. Variation in various aberrations, such as lateral chromatic aberration, image plane curvature and astigmatism, increase during zooming and focusing.

The conditional expression (5) defines the interval between the exit surface of the reflection unit and the image plane. If the interval becomes too large exceeding the upper limit of the conditional expression (5), the refractive powers of the fourth lens unit L4 and the fifth lens unit L5 can be weakened, which is advantageous for aberration correction. However, the length of the light path on the optical axis after the light path is bent by the reflection unit PR becomes too long, which increases the size of the lens system. In contrast, if the interval becomes too small falling short of the lower limit of the conditional expression (5), the refractive powers of the fourth lens unit L4 and the fifth lens unit L5 become strong, and variation in various aberrations, such as lateral chromatic aberration, image plane curvature and astigmatism, during zooming and focusing increases, which is disadvantageous.

The conditional expression (6) defines the zoom stroke (the amount of movement) of the second lens unit L2. If the zoom stroke of the second lens unit L2 becomes too short exceeding the upper limit of the conditional expression (6), the refractive power of the second lens unit L2 is required to be strong to achieve a high zoom ratio. Thus, variation in various aberrations, such as lateral chromatic aberration, image plane curvature and astigmatism, increases during zooming. In contrast, if the zoom stroke of the second lens unit L2 becomes too long falling short of the lower limit of conditional expression (6), the total lens length becomes long, which makes reduction in size of the entire lens system difficult.

The conditional expression (7) defines the negative refractive power of the second lens unit L2. If the absolute value of the focal length of the second lens unit L2 becomes too large (the negative refractive power is weakened) exceeding the upper limit of the conditional expression (7), the zoom stroke of the second lens unit L2 for achieving a high zoom ratio becomes too long, and the total lens length becomes long. In contrast, if the absolute value of the focal length of the second lens unit L2 becomes too small (the negative refractive power is strong) falling short of the lower limit of the conditional expression (7), occurrence of various aberrations, such as lateral chromatic aberration, image plane curvature and astigmatism, at the second lens unit L2 increases. Furthermore, variation in various aberrations increases during zooming. Accordingly, it is difficult to achieve a high zoom ratio.

The conditional expression (8) defines the positive refractive power of the first lens unit L1. If the focal length of the first lens unit L1 becomes too long (the positive refractive power is weakened) exceeding the upper limit of the conditional expression (8), the absolute value of the transverse magnification of the second lens unit L2 at the telephoto end becomes too small. Accordingly, the second lens unit L2 cannot achieve a sufficient variable magnification ratio. It is thus difficult to achieve a high zoom ratio. In contrast, the focal length of the first lens unit L1 becomes too short (the positive refractive power is strong) falling short of the lower limit of the conditional expression (8), a large on-axis chromatic aberration and spherical aberration occur at the telephoto end and positions adjacent thereto, which makes difficult to achieve a high optical performance.

The conditional expression (9) defines the variable magnification ratio of the second lens unit L2. If the variable magnification ratio of the second lens unit L2 becomes too high exceeding the upper limit of the conditional expression (9), the high value is advantageous for achieving a high zoom ratio. However, variation in various aberrations, such as lateral chromatic aberration, image plane curvature and astigmatism, at the second lens unit L2 according to zooming becomes too large. Accordingly, it becomes difficult to achieve a high optical performance in the entire zoom range. In contrast, if the variable magnification ratio of the second lens unit L2 becomes too low falling short of the lower limit of the conditional expression (9), it becomes difficult to achieve a high zoom ratio.

The conditional expression (10) defines the refractive powers of the fourth lens unit L4 and the fifth lens unit L5, which are two lens units nearer to the object and to the image than the reflection unit PR, respectively. If the absolute value of the focal length of the fourth lens unit L4 becomes much higher (the negative refractive power is weakened) exceeding the upper limit of the conditional expression (10) than the focal length of the fifth lens unit L5, the incident height of off-axial rays passing through the reflection unit PR increases, which in turn increases the size of the reflection unit PR. Furthermore, the amount of movement required for image plane correction and focusing of the fourth lens unit L4 becomes too large. Accordingly, reduction in size of the entire lens system becomes difficult.

In contrast, if the absolute value of the focal length of the fourth lens unit L4 becomes much lower (the negative refractive power becomes strong) falling short of the lower limit of the conditional expression (10) than the focal length of the fifth lens unit L5, it is disadvantageous because of the following reasons. Variation in various aberrations, such as lateral chromatic aberration, image plane curvature and astigmatism, according to zooming and focusing become too large. Accordingly, it becomes difficult to achieve a high zoom ratio.

The conditional expression (11) defines the positive refractive power of the fifth lens unit L5. If the focal length of the fifth lens unit L5 becomes too long (the positive refractive power is weakened) exceeding the upper limit of the conditional expression (11), it becomes difficult to apply a sufficient converging effect to off-axial rays, and telecentricity decreases. If the focal length of the fifth lens unit L5 becomes too short (the positive refractive power becomes strong) falling short of the lower limit of the conditional expression (11), the fifth lens unit L5 largely causes various aberrations, such as lateral chromatic aberration, image plane curvature and astigmatism. Accordingly, it becomes difficult to cause another lens unit to correct these various aberrations.

The conditional expression (12) defines the material of the positive lens included in the second lens unit L2. If the Abbe number for d-line of the material of the positive lens becomes too high (the dispersion becomes small) exceeding the upper limit of the conditional expression (12), the correction of the negative lateral chromatic aberration caused by the negative lens of the second lens unit L2 becomes insufficient. Accordingly, it becomes difficult to achieve a high zoom ratio. In contrast, the Abbe number for d-line of the material of the positive lens becomes too small (the dispersion becomes large) falling short of the lower limit of the conditional expression (12), the negative lateral chromatic aberration caused by the negative lens of the second lens unit L2 is excessively corrected. Accordingly, it becomes difficult to achieve a high zoom ratio. It is further appropriate to set the numerical value ranges of the conditional expressions (1) to (12) as follows.

$$0.9 < -f3/f4 < 1.4 \tag{1a}$$

$$0.03 < -f4/ft < 0.10 \tag{2a}$$

$$0.5 < f3/f5 < 1.0 \tag{3a}$$

$$2.2 < D45min/fw < 3.2 \tag{4a}$$

$$0.06 < Dpi/Lt < 0.30 \tag{5a}$$

$$0.05 < Ymax/|m2| < 0.12 \tag{6a}$$

$$0.025 < -f2/ft < 0.065 \tag{7a}$$

$$9.0 < f1/fw < 17.0 \tag{8a}$$

$$25 < \beta 2t/\beta 2w < 60 \tag{9a}$$

$$0.50 < -f4/f5 < 0.85 \tag{10a}$$

$$0.07 < f5/ft < 0.13 \tag{11a}$$

$$12.0 < vd2 < 21.0 \tag{12a}$$

Furthermore, if the numerical value ranges of the conditional expressions (1a) to (12a) are set as follows, advantageous effects intended by the respective conditional expressions can be securely exerted.

$$1.0 < -f3/f4 < 1.3 \tag{1b}$$

$$0.04 < -f4/ft < 0.09 \tag{2b}$$

$$0.6 < f3/f5 < 0.9 \tag{3b}$$

$$2.4 < D45min/fw < 3.0 \tag{4b}$$

$$0.08 < Dpi/Lt < 0.25 \qquad (5b)$$

$$0.07 < Y\max/|m2| < 0.10 \qquad (6b)$$

$$0.03 < -f2/ft < 0.06 \qquad (7b)$$

$$9.5 < f1/fw < 15.0 \qquad (8b)$$

$$28 < \beta 2t/\beta 2w < 50 \qquad (9b)$$

$$0.55 < -f4/f5 < 0.80 \qquad (10b)$$

$$0.08 < f5/ft < 0.12 \qquad (11b)$$

$$13.0 < vd2 < 19.0 \qquad (12b)$$

Next, characteristics of the lens configurations of the respective embodiments are described.

The fourth lens unit L4 is disposed between the third lens unit L3 having the positive refractive power and the fifth lens unit L5 having the positive refractive power. Both incident heights of on-axis rays and off-axial rays on the lens surface pass through low positions. Accordingly, the fourth lens unit L4 can have a relatively large refractive power. As a result, the fourth lens unit L4 can have a large transverse magnification, and a short focus stroke (the amount of movement for focusing), thereby facilitating reduction in the total lens length.

The fourth lens unit L4 is made of one lens component (one of a single lens and a cemented lens in which multiple lenses are cemented together). Such a configuration can reduce the drive torque required for focusing. Accordingly, a smaller actuator can be adopted, thereby facilitating reduction in size of the entire lens system. It is appropriate that the fourth lens unit L4 be a cemented lens including one positive lens and one negative lens cemented together. This configuration facilitates reducing variation in aberrations, such as the lateral chromatic aberration and image plane curvature according to focusing.

The fifth lens unit L5 consists of one lens component. Such a configuration can reduce the light path length after the optical axis is bent by the reflection member PR, and facilitate reduction in size of the lens system. It is appropriate that the fifth lens unit L5 be a cemented lens including one positive lens and one negative lens cemented together. This configuration facilitates reduction in lateral chromatic aberration.

Next, characteristics of specific lens configurations of the respective embodiments are described. The lens configurations of the respective embodiments are also described. Unless otherwise specified, the lens configuration is described assuming that components are arranged from the object side to the image plane side. In each embodiment, during zooming from the wide angle end to the telephoto end, magnification is changed by moving the second lens unit L2 toward the image plane, and the image plane variation is corrected and focusing is performed according to change in magnification by moving the fourth lens unit L4.

During zooming from the wide angle end to the telephoto end, in Embodiments 1, 2, 3 and 5, the first lens unit L1 does not move, and in Embodiment 4, the first lens unit L1 is moved along a locus convex toward the image. If the first lens unit is immobile, the zoom mechanism can be simplified. Instead, if the first lens unit is movable, the entrance pupil distance is reduced from the wide angle end to an intermediate zoom range where the front lens effective diameter is defined, thereby facilitating reduction in size of the front lens effective diameter. During zooming from the wide angle end to the telephoto end, in Embodiments 1 and 4, the third lens unit L3 does not move, and in Embodiments 2, 3 and 5, this lens unit is moved toward the object.

If the third lens unit is immobile, the zoom mechanism can be simplified. Instead, if the third lens unit is movable, the flexibility for correcting aberrations is improved, which can appropriately correct variation in various aberrations, such as chromatic aberration, image plane curvature and astigmatism, according to zooming. Furthermore, the space for the focus stroke for focusing the fourth lens unit L4 can easily secured. The aperture stop SP is arranged nearer to the object than the third lens unit L3. During zooming, the aperture stop SP does not move in Embodiments 1 and 4, and moves toward the object together with the third lens unit L3 in Embodiments 2, 3 and 5.

In each embodiment, the aperture stop diameter of the aperture stop SP is movable during zooming, and unnecessary flare is cut from the intermediate zoom position to the telephoto end, thereby favorably maintaining the optical performance while achieving a high zoom ratio. The aperture stop SP may be moved independently from the third lens unit L3 (along a different locus) during zooming. In this case, the stop diameter can be reduced in size, and off-axis flare can be favorably shielded at the intermediate zoom position.

In Embodiments 1, 2, 3 and 5, the first lens unit L1 includes, in order from the object side to the image side: a cemented lens including a meniscus-shaped negative lens having a convex surface toward the object and a positive lens having a convex surface toward the object, the lenses being cemented together; and two meniscus-shaped positive lenses having convex surfaces toward the object. In Embodiment 4, the first lens unit L1 includes, in order from the object side to the image side: the cemented lens including the meniscus-shaped negative lens having the convex surface toward the object and the positive lens having the convex surface toward the object, the lenses being cemented together; and a meniscus-shaped positive lens having the convex surface toward the object.

The configuration of the first lens unit L1 including the multiple positive lenses favorably corrects variation in various aberrations, such as spherical aberration at the telephoto end which increases with achievement of a high zoom ratio, and on-axis chromatic aberration and lateral chromatic aberration which are caused according to zooming.

In Embodiment 5, the positive lens of the first lens unit L1 that is arranged nearest to the image has a lens surface that is nearer to the object and has an aspheric shape. Accordingly, variation in image plane curvature and astigmatism according to zooming can be suppressed, thereby facilitating achieving a high zoom ratio. In Embodiments 1 to 4, the second lens unit L2 includes, in order from the object side to the image side: a negative lens having a concave surface toward the image with the absolute value of the refractive power higher (larger) than the value of the surface toward the object; a biconcave-shaped negative lens; and a positive lens having the convex surface toward the object. In Embodiment 5, the second lens unit L2 includes, in order from the object side to the image side: a negative lens having a concave surface toward the image with the absolute value of the refractive power higher than the value of the surface toward the object; a biconcave-shaped negative lens; and a cemented lens including a positive lens having a convex surface toward the object and a negative lens having a concave surface toward the image with a stronger power, the lenses being cemented together.

The second lens unit L2 is a lens unit that exerts a principal effect of varying magnification, and includes the multiple negative lenses to have a strong negative refractive power. This configuration effectively suppresses variation in various aberrations, such as image plane curvature, astigmatism and lateral chromatic aberration, according to zooming. The second lens unit L2 may have at least one lens surface having an aspheric shape. This configuration facilitates reducing variation in various aberrations, such as image plane curvature and astigmatism, according to zooming.

In Embodiments 1 to 4, the third lens unit L3 includes, in order from the object side to the image side: a positive lens having a convex surface toward the object; a negative lens having a concave surface toward the image plane with the absolute value of a refractive power higher than the value of a surface toward the object; and a biconvex-shaped positive lens. In Embodiment 5, the third lens unit L3 includes, in order from the object side to the image side: a positive lens having a convex surface toward the object; a cemented lens including a positive lens having a convex surface toward the object and a negative lens that are cemented together, the negative lens having a concave surface toward the image with the absolute value of a refractive power higher than the value of a surface toward the object; and a biconvex-shaped positive lens.

Such a configuration with the third lens unit L3 including at least two positive lenses and one negative lens reduces spherical aberration and on-axis chromatic aberration, and variation in image plane curvature and astigmatism according to zooming. In each embodiment, the positive lens of the third lens unit L3 that is nearest to the object has an aspheric surface, which effectively corrects spherical aberration. Furthermore, the positive lens nearest to the image has a surface that is nearer to the image and has an aspheric shape, which suppresses variation in image plane curvature and astigmatism according to zooming, and facilitates achieving a high zoom ratio.

In each embodiment, the fourth lens unit L4 is a cemented lens including the positive lens and the negative lens cemented together. Accordingly, variation in chromatic aberration, image plane curvature and astigmatism during zooming and focusing is reduced. Furthermore, the positive lens and the negative lens are cemented to configure the one lens component, which facilitates assembling and reduction in size of the fourth lens unit L4, and reduction in size of the entire system.

The fifth lens unit L5 is a cemented lens including a positive lens and a negative lens cemented together. Alternatively, this lens unit is a cemented lens including a negative lens and a positive lens cemented together. Accordingly, aberrations, such as lateral chromatic aberration, image plane curvature and astigmatism, for off-axial rays are effectively corrected while the single component lens configuration is adopted, thereby achieving reduction in thickness of the fifth lens unit L5. In each embodiment, the fourth lens unit L4 and the fifth lens unit L5 have the same order of the positive lens and the negative lens to allow rays to sequentially pass through lenses with refractive powers with different signs, thereby effectively correcting color flare.

In each embodiment, as illustrated in FIG. 11, the reflection unit PR that bends light from the object is inserted between the fourth lens unit L4 and the fifth lens unit L5. The reflection unit PR is the prism. Alternatively, this unit may be a mirror. The incident surface and the exit surface of the prism may have a refractive power of a spherical or an aspheric shape. This configuration can improve flexibility for correcting aberrations.

The favorable embodiments of the present invention have been described above. However, the present invention is not limited to these embodiments. Instead, various modifications and changes can be made within the scope of the gist thereof.

Next, an embodiment of a video camera (optical device) that adopts a zoom lens of the present invention as an imaging optical system is described with reference to FIG. 12.

FIG. 12 illustrates a video camera body 10, an imaging optical system 11 that includes any of zoom lenses described in Embodiments 1 to 5. A solid image pickup element 12 (photo-electric conversion element), such as a CCD sensor or a CMOS sensor, is embedded in the camera body and receives a subject image formed by the imaging optical system 11. A monitor 13 includes a liquid crystal panel for viewing a subject image photoelectric-converted by the solid image pickup element 12. Such application of the zoom lens of the present invention to the image pickup device, such as a video camera, can achieve the image pickup device that is small and has high optical performance.

In Embodiment 4, a negative distortion is largely caused around the wide angle end, and the imaging range therefor of the solid image pickup element is configured to be within a range smaller than the ranges for the other zoom positions. That is, the zoom lens of Embodiment 4 has smaller effective image diameters (image heights) at the wide angle end and zoom positions adjacent thereto than effective image diameters (image heights) at other zoom positions (telephoto end). In the case of adopting the zoom lens of Embodiment 4 in the image pickup device, an image with small distortion may be output by electrically correcting distortion of acquired image information using a signal processing circuit that processes image data of the solid image pickup element.

In each embodiment, the above configuration can achieve a zoom lens in which the entire optical system is small and which has a high zoom ratio and high optical performance over the entire zoom range. Furthermore, as illustrated in FIG. 11, the zoom lens of each embodiment includes the reflection member PR that bends light from the object and arranged between the fourth lens unit L4 and the fifth lens unit L5, thereby facilitating reduction in thickness of the camera.

Next, Numerical Examples 1 to 5 corresponding to respective Embodiments 1 to 5 of the present invention are described. In each numerical example, an order i of optical surfaces is taken from the object side. A curvature radius ri is of the i-th optical surface (i-th). An interval di is between the i-th and (i+1)-th surfaces. A refractive index ndi and an Abbe number vdi are of the material of the i-th optical member for d-line. k denotes an eccentricity. A4, A6, A8 and A10 are aspheric coefficients. A displacement x is in the optical axis direction at a position with a height h from the optical axis with reference to the surface apex. The aspheric shape is represented as follows.

$$x = (h^2/R)/[1+[1-(1+k)(h/R)^2]^{1/2}] + A4h^4 + A6h^6 + A8h^8 + A10h^{10}.$$

Note that R is a paraxial curvature radius. For instance, "E-Z" represents "$10^{-Z}$". r24 and r25 in Numerical Examples 1, 2 and 3, r22 and r23 in Numerical Example 4, and r26 and r27 in Numerical Example 5 denote the incident surface and the exit surface of the reflection unit. The last two surfaces in each numerical example are surfaces of an optical block, such as a filter and a faceplate. In each example, a back focus (BF) is the distance in air from the last lens surface to a paraxial image plane. The total lens length is acquired by adding the back focus to the distance from the lens surface nearest to the object to the last lens surface.

In Numerical Example 4, the effective diameter (image height) at the wide angle end is smaller than the effective image diameter (image height) at the telephoto end. Table 1 descries correspondence to the foregoing conditional expression in each numerical example.

Numerical Example 1

Unit mm

Surface Data

| Surface number | r | d | nd | vd |
|---|---|---|---|---|
| 1 | 61.944 | 1.30 | 1.85124 | 24.5 |
| 2 | 39.165 | 3.59 | 1.49700 | 81.5 |
| 3 | 270.910 | 0.15 | | |
| 4 | 59.615 | 2.46 | 1.49700 | 81.5 |
| 5 | 289.229 | 0.15 | | |
| 6 | 34.970 | 2.93 | 1.59522 | 67.7 |
| 7 | 98.692 | (Variable) | | |
| 8 | 40.531 | 0.55 | 1.88300 | 40.8 |
| 9 | 6.195 | 3.64 | | |
| 10 | −21.145 | 0.50 | 1.77250 | 49.6 |
| 11 | 21.763 | 0.20 | | |
| 12 | 12.645 | 1.47 | 1.95906 | 17.5 |
| 13 | 38.528 | (Variable) | | |
| 14 (Stop) | ∞ | 1.00 | | |
| 15* | 10.358 | 4.97 | 1.69350 | 53.2 |
| 16* | −111.278 | 0.15 | | |
| 17 | 12.612 | 0.60 | 1.95906 | 17.5 |
| 18 | 7.987 | 1.44 | | |
| 19 | 10.985 | 3.80 | 1.49710 | 81.6 |
| 20* | −20.029 | (Variable) | | |
| 21 | 49.485 | 0.55 | 1.88300 | 40.8 |
| 22 | 5.550 | 1.04 | 1.95906 | 17.5 |
| 23 | 7.212 | (Variable) | | |
| 24 | ∞ | 9.00 | 1.90366 | 31.3 |
| 25 | ∞ | 1.50 | | |
| 26 | 11.370 | 0.50 | 1.95906 | 17.5 |
| 27 | 7.714 | 3.10 | 1.62299 | 58.2 |
| 28 | −16.811 | 2.50 | | |
| 29 | ∞ | 1.44 | 1.51633 | 64.1 |
| 30 | ∞ | 0.50 | | |
| Image plane | ∞ | | | |

Aspheric data

Fifteenth surface

K = −1.98282e−001  A4 = −2.37056e−005  A6 = 6.56385e−008
A8 = 5.49759e−010

Sixteenth surface

K = 0.00000e+000  A4 = 1.55533e−004  A6 = −3.59762e−007

Twentieth surface

K = −7.82220e+000  A4 = −6.67733e−005  A6 = 1.59117e−006

Various types of data
Zoom ratio 30.39

| | Wide-angle | Intermediate | Telephoto |
|---|---|---|---|
| Focal length | 4.80 | 54.39 | 145.90 |
| F-number | 1.80 | 3.60 | 4.80 |
| Half angle of view (degree) | 32.00 | 3.16 | 1.18 |
| Image height | 3.00 | 3.00 | 3.00 |
| Total lens length | 95.49 | 95.49 | 95.49 |
| BF | 3.95 | 3.95 | 3.95 |
| d7 | 0.60 | 30.81 | 36.14 |
| d13 | 38.34 | 8.13 | 2.80 |
| d20 | 1.00 | 5.80 | 0.80 |
| d23 | 7.02 | 2.22 | 7.22 |

Unit mm

Zoom lens unit data

| Group | Start surface | Focal length |
|---|---|---|
| 1 | 1 | 49.22 |
| 2 | 8 | −6.71 |
| 3 | 14 | 11.66 |
| 4 | 21 | −10.14 |
| PR | 24 | ∞ |
| 5 | 26 | 13.33 |

Numerical Example 2

Surface Data

| Surface number | r | d | nd | vd |
|---|---|---|---|---|
| 1 | 49.367 | 1.20 | 1.86451 | 24.3 |
| 2 | 35.923 | 3.85 | 1.49700 | 81.5 |
| 3 | 249.645 | 0.15 | | |
| 4 | 53.700 | 2.23 | 1.49700 | 81.5 |
| 5 | 238.303 | 0.15 | | |
| 6 | 41.982 | 1.63 | 1.59522 | 67.7 |
| 7 | 71.311 | (Variable) | | |
| 8 | 38.714 | 0.30 | 2.06342 | 26.7 |
| 9 | 7.842 | 4.62 | | |
| 10 | −21.532 | 0.30 | 1.60311 | 60.6 |
| 11 | 20.107 | 0.20 | | |
| 12 | 15.259 | 1.46 | 2.15132 | 14.3 |
| 13 | 43.292 | (Variable) | | |
| 14 (Stop) | ∞ | 1.00 | | |
| 15* | 8.898 | 4.52 | 1.77250 | 49.5 |
| 16* | 65.952 | 0.15 | | |
| 17 | 19.398 | 0.60 | 1.84666 | 23.9 |
| 18 | 6.614 | 1.10 | | |
| 19 | 8.328 | 3.39 | 1.55332 | 71.7 |
| 20* | −23.244 | (Variable) | | |
| 21 | −57.962 | 1.10 | 1.95906 | 17.5 |
| 22 | −11.827 | 0.40 | 1.83481 | 42.7 |
| 23 | 10.177 | (Variable) | | |
| 24 | ∞ | 8.50 | 1.90366 | 31.3 |
| 25 | ∞ | 1.50 | | |
| 26 | 17.170 | 2.79 | 1.59522 | 67.7 |
| 27 | −7.707 | 0.40 | 1.92286 | 18.9 |
| 28 | −12.647 | 4.97 | | |
| 29 | ∞ | 1.44 | 1.51633 | 64.1 |
| 30 | ∞ | 0.50 | | |
| Image plane | ∞ | | | |

Aspheric data

Fifteenth surface

K = −2.34771e−001  A4 = 4.48906e−006  A6 = 8.67393e−008
A8 = 3.21744e−009

Sixteenth surface

K = 0.00000e+000  A4 = 1.16343e−004  A6 = −5.93189e−007

Twentieth surface

K = −8.36369e+000  A4 = 4.90643e−005  A6 = 1.58999e−006

Various types of data
Zoom ratio 34.06

| | Wide-angle | Intermediate | Telephoto |
|---|---|---|---|
| Focal length | 4.40 | 31.61 | 150.00 |
| F-number | 1.80 | 2.80 | 4.80 |
| Half angle of view (degree) | 34.26 | 5.42 | 1.15 |
| Image height | 3.00 | 3.00 | 3.00 |

-continued

| | | | |
|---|---|---|---|
| Total lens length | 99.71 | 99.71 | 99.71 |
| BF | 6.42 | 6.42 | 6.42 |
| d7 | 0.60 | 28.53 | 40.49 |
| d13 | 46.98 | 14.43 | 1.60 |
| d20 | 2.16 | 5.93 | 0.99 |
| d23 | 2.01 | 2.86 | 8.66 |

Zoom lens unit data

| Group | Start surface | Focal length |
|---|---|---|
| 1 | 1 | 54.97 |
| 2 | 8 | −8.32 |
| 3 | 14 | 12.75 |
| 4 | 21 | −11.26 |
| PR | 24 | ∞ |
| 5 | 26 | 15.78 |

Numerical Example 3

Surface Data

| Surface number | r | d | nd | νd |
|---|---|---|---|---|
| 1 | 53.218 | 1.35 | 2.00069 | 25.5 |
| 2 | 38.736 | 4.14 | 1.43875 | 94.9 |
| 3 | 303.565 | 0.12 | | |
| 4 | 45.530 | 2.93 | 1.49700 | 81.5 |
| 5 | 168.829 | 0.12 | | |
| 6 | 42.067 | 2.42 | 1.59522 | 67.7 |
| 7 | 96.383 | (Variable) | | |
| 8 | 51.543 | 0.50 | 1.88300 | 40.8 |
| 9 | 7.156 | 4.50 | | |
| 10 | −32.875 | 0.40 | 1.77250 | 49.6 |
| 11 | 20.106 | 0.20 | | |
| 12 | 13.188 | 1.27 | 2.10205 | 16.8 |
| 13 | 26.882 | (Variable) | | |
| 14 (Stop) | ∞ | 1.00 | | |
| 15* | 10.209 | 4.24 | 1.59522 | 67.7 |
| 16* | −88.284 | 0.15 | | |
| 17 | 11.962 | 0.65 | 2.10300 | 18.1 |
| 18 | 8.773 | 1.43 | | |
| 19 | 15.187 | 3.63 | 1.49710 | 81.6 |
| 20* | −16.532 | (Variable) | | |
| 21 | −112.751 | 0.93 | 1.95906 | 17.5 |
| 22 | −14.577 | 0.45 | 1.88300 | 40.8 |
| 23 | 9.087 | (Variable) | | |
| 24 | ∞ | 8.00 | 1.90366 | 31.3 |
| 25 | ∞ | 1.50 | | |
| 26* | 20.153 | 2.56 | 1.55332 | 71.7 |
| 27 | −7.972 | 0.45 | 1.94595 | 18.0 |
| 28 | −10.716 | 4.97 | | |
| 29 | ∞ | 1.44 | 1.51633 | 64.1 |
| 30 | ∞ | 0.50 | | |
| Image plane | ∞ | | | |

Aspheric data

Fifteenth surface

K = 3.64566e−002   A4 = −3.77910e−005   A6 = 1.72584e−007
A8 = −2.71762e−010

Sixteenth surface

K = 0.00000e+000   A4 = 2.06477e−004   A6 = 1.08219e−008

Twentieth surface

K = −1.22427e+000   A4 = −2.64075e−005   A6 = 1.50935e−006

Twenty sixth surface

K = −1.25980e+001   A4 = 8.75991e−005   A6 = −1.15266e−006

-continued

Various types of data
Zoom ratio 39.94

| | Wide-angle | Intermediate | Telephoto |
|---|---|---|---|
| Focal length | 4.21 | 31.84 | 168.00 |
| F-number | 1.80 | 2.70 | 4.80 |
| Half angle of view (degree) | 35.50 | 5.38 | 1.02 |
| Image height | 3.00 | 3.00 | 3.00 |
| Total lens length | 99.66 | 99.66 | 99.66 |
| BF | 6.42 | 6.42 | 6.42 |
| d7 | 0.55 | 27.68 | 39.31 |
| d13 | 45.42 | 13.61 | 1.60 |
| d20 | 2.32 | 6.03 | 1.00 |
| d23 | 2.01 | 2.98 | 8.39 |

Zoom lens unit data

| Group | Start surface | Focal length |
|---|---|---|
| 1 | 1 | 53.51 |
| 2 | 8 | −7.46 |
| 3 | 14 | 12.09 |
| 4 | 21 | −9.91 |
| PR | 24 | ∞ |
| 5 | 26 | 15.36 |

Numerical Example 4

Surface Data

| Surface number | r | d | nd | νd |
|---|---|---|---|---|
| 1 | 47.511 | 1.30 | 2.00069 | 25.5 |
| 2 | 33.865 | 5.23 | 1.49700 | 81.5 |
| 3 | −252.957 | 0.15 | | |
| 4 | 33.735 | 2.66 | 1.59522 | 67.7 |
| 5 | 85.661 | (Variable) | | |
| 6 | 55.880 | 0.55 | 1.88300 | 40.8 |
| 7 | 8.796 | 3.69 | | |
| 8 | −15.933 | 0.50 | 1.83481 | 42.7 |
| 9 | 12.697 | 0.40 | | |
| 10 | 14.128 | 1.58 | 1.95906 | 17.5 |
| 11 | ∞ | (Variable) | | |
| 12 (Stop) | ∞ | 1.00 | | |
| 13* | 10.033 | 3.89 | 1.76802 | 49.2 |
| 14* | 209.601 | 0.15 | | |
| 15 | 14.493 | 0.60 | 1.95906 | 17.5 |
| 16 | 8.463 | 1.28 | | |
| 17 | 11.790 | 3.15 | 1.55332 | 71.7 |
| 18* | −20.121 | (Variable) | | |
| 19 | 70.404 | 0.55 | 1.88300 | 40.8 |
| 20 | 5.868 | 1.07 | 1.92286 | 18.9 |
| 21 | 8.130 | (Variable) | | |
| 22 | ∞ | 9.00 | 1.90366 | 31.3 |
| 23 | ∞ | 1.49 | | |
| 24 | 11.665 | 0.50 | 1.92286 | 18.9 |
| 25 | 7.375 | 2.74 | 1.69680 | 55.5 |
| 26 | −26.741 | 3.07 | | |
| 27 | ∞ | 1.44 | 1.51633 | 64.1 |
| 28 | ∞ | 0.50 | | |
| Image plane | ∞ | | | |

Aspheric data

Thirteenth surface

K = −8.40076e−002   A4 = −1.18328e−005   A6 = 7.48392e−009
A8 = 2.64192e−009

Fourteenth surface

K = 0.00000e+000   A4 = 1.75182e−004   A6 = −6.26470e−007

Eighteenth surface

K = −1.30896e+001    A4 = −1.22274e−004    A6 = 4.16829e−006

Various types of data
Zoom ratio 29.96

| | Wide-angle | Intermediate | Telephoto |
|---|---|---|---|
| Focal length | 4.51 | 49.24 | 135.00 |
| F-number | 1.80 | 3.60 | 4.90 |
| Half angle of view (degree) | 32.04 | 3.49 | 1.27 |
| Image height | 2.82 | 3.00 | 3.00 |
| Total lens length | 92.69 | 94.11 | 95.65 |
| BF | 4.52 | 4.52 | 4.52 |
| d5 | 0.60 | 32.58 | 39.10 |
| d11 | 38.10 | 7.54 | 2.56 |
| d18 | 0.98 | 6.02 | 0.99 |
| d21 | 7.02 | 1.98 | 7.01 |

Zoom lens unit data

| Group | Start surface | Focal length |
|---|---|---|
| 1 | 1 | 52.98 |
| 2 | 6 | −6.99 |
| 3 | 12 | 11.16 |
| 4 | 19 | −10.80 |
| PR | 22 | ∞ |
| 5 | 24 | 13.78 |

Numerical Example 5

Surface Data

| Surface number | r | d | nd | vd |
|---|---|---|---|---|
| 1 | 53.222 | 1.20 | 1.80518 | 25.4 |
| 2 | 39.278 | 5.57 | 1.43875 | 94.9 |
| 3 | 302.358 | 0.12 | | |
| 4 | 43.975 | 4.17 | 1.43875 | 94.9 |
| 5 | 188.207 | 0.12 | | |
| 6* | 43.669 | 3.02 | 1.49710 | 81.6 |
| 7 | 104.636 | (Variable) | | |
| 8 | 59.650 | 0.40 | 1.95375 | 32.3 |
| 9 | 7.154 | 4.38 | | |
| 10 | −27.723 | 0.35 | 1.88300 | 40.8 |
| 11 | 32.799 | 0.19 | | |
| 12 | 14.195 | 1.63 | 2.10205 | 16.8 |
| 13 | 125.415 | 0.35 | 1.88300 | 40.8 |
| 14 | 23.609 | (Variable) | | |
| 15 (Stop) | ∞ | 1.00 | | |
| 16* | 12.547 | 3.88 | 1.55332 | 71.7 |
| 17* | −135.531 | 0.15 | | |
| 18 | 10.103 | 2.39 | 1.49710 | 81.6 |
| 19 | 14.670 | 0.50 | 1.84666 | 23.9 |
| 20 | 7.970 | 0.98 | | |
| 21 | 9.559 | 3.40 | 1.49710 | 81.6 |
| 22* | −18.111 | (Variable) | | |
| 23 | −1163.591 | 0.95 | 1.95906 | 17.5 |
| 24 | −17.454 | 0.45 | 1.88300 | 40.8 |
| 25 | 8.855 | (Variable) | | |
| 26 | ∞ | 7.50 | 1.69680 | 55.5 |
| 27 | ∞ | 2.36 | | |
| 28* | 21.027 | 2.62 | 1.49710 | 81.6 |
| 29 | −6.380 | 0.45 | 2.00100 | 29.1 |
| 30 | −8.901 | 4.97 | | |
| 31 | ∞ | 1.44 | 1.51633 | 64.1 |
| 32 | ∞ | 0.50 | | |
| Image plane | ∞ | | | |

Aspheric data

Sixth surface

K = 7.01709e−002    A4 = −3.90826e−007    A6 = −3.12700e−010
A8 = 2.28127e−014

Sixteenth surface

K = 3.72057e−001    A4 = −1.11050e−005    A6 = 5.67072e−008
A8 = 1.36918e−009    A10 = −9.50135e−012

Seventeenth surface

K = 0.00000e+000    A4 = 1.26977e−004    A6 = 1.98630e−007

Twenty second surface

K = −2.73027e+000    A4 = 9.65593e−005    A6 = 6.44004e−007

Twenty eighth surface

K = 5.77093e+000    A4 = −1.45305e−004    A6 = 4.45854e−006
A8 = −1.14937e−007

Various types of data
Zoom ratio 49.97

| | Wide-angle | Intermediate | Telephoto |
|---|---|---|---|
| Focal length | 4.10 | 53.68 | 205.01 |
| F-number | 1.85 | 3.80 | 4.95 |
| Half angle of view (degree) | 36.17 | 3.20 | 0.84 |
| Image height | 3.00 | 3.00 | 3.00 |
| Total lens length | 104.59 | 104.59 | 104.59 |
| BF | 6.42 | 6.42 | 6.42 |
| d7 | 0.50 | 31.47 | 39.22 |
| d14 | 46.17 | 9.33 | 0.60 |
| d22 | 1.36 | 6.56 | 0.99 |
| d25 | 2.00 | 2.66 | 9.23 |

Zoom lens unit data

| Group | Start surface | Focal length |
|---|---|---|
| 1 | 1 | 54.58 |
| 2 | 8 | −6.72 |
| 3 | 15 | 12.06 |
| 4 | 23 | −10.40 |
| PR | 26 | ∞ |
| 5 | 28 | 17.53 |

TABLE 1

| Conditional Expression | Numerical Example 1 | Numerical Example 2 | Numerical Example 3 | Numerical Example 4 | Numerical Example 5 |
|---|---|---|---|---|---|
| (1) | 1.15 | 1.13 | 1.22 | 1.03 | 1.16 |
| (2) | 0.0704 | 0.0750 | 0.0590 | 0.0800 | 0.0507 |
| (3) | 0.875 | 0.808 | 0.787 | 0.810 | 0.688 |
| (4) | 2.64 | 2.73 | 2.74 | 2.77 | 2.89 |
| (5) | 0.100 | 0.116 | 0.115 | 0.102 | 0.185 |
| (6) | 0.0844 | 0.0752 | 0.0774 | 0.0844 | 0.0775 |
| (7) | 0.0466 | 0.0554 | 0.0444 | 0.0518 | 0.0328 |
| (8) | 10.27 | 12.48 | 12.72 | 11.76 | 13.30 |
| (9) | 30.06 | 34.90 | 46.33 | 29.87 | 37.65 |
| (10) | 0.761 | 0.713 | 0.645 | 0.784 | 0.594 |
| (11) | 0.093 | 0.105 | 0.091 | 0.102 | 0.085 |
| (12) | 17.5 | 14.3 | 16.8 | 17.5 | 16.8 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-081119, filed Apr. 9, 2013, which is hereby incorporated by reference herein in its entirety.

What is claimed is:

1. A zoom lens, comprising, in order from an object side to an image plane side: a first lens unit having a positive refractive power; a second lens unit having a negative refractive power; a third lens unit having a positive refractive power; a fourth lens unit having a negative refractive power; and a fifth lens unit having a positive refractive power,
wherein at least the second lens unit and the fourth lens unit move during zooming such that at a telephoto end, in comparison with a wide angle end, an interval between the first lens unit and the second lens unit increases, an interval between the second lens unit and the third lens unit decreases, an interval between the third lens unit and the fourth lens unit changes, and an interval between the fourth lens unit and the fifth lens unit increases, and the fifth lens unit does not move, and
the zoom lens further comprises a reflection unit for bending a light path, between the fourth lens unit and the fifth lens unit.

2. The zoom lens according to claim 1, wherein a conditional expression, $$0.8 < -f3/f4 < 1.5$$

is satisfied, where a focal length of the third lens unit is f3, and a focal length of the fourth lens unit is f4.

3. The zoom lens according to claim 1, wherein a conditional expression, $$0.02 < -f4/ft < 0.12$$

is satisfied, where a focal length of the fourth lens unit is f4, and a focal length of an entire system at the telephoto end is ft.

4. The zoom lens according to claim 1, wherein a conditional expression, $$0.4 < f3/f5 < 1.1$$

is satisfied, where a focal length of the third lens unit is f3, and a focal length of the fifth lens unit is f5.

5. The zoom lens according to claim 1, wherein the fourth lens unit moves during focusing.

6. The zoom lens according to claim 1, wherein the fifth lens unit consists of one lens component.

7. The zoom lens according to claim 1, wherein the fourth lens unit consists of one lens component.

8. The zoom lens according to claim 1, wherein a conditional expression, $$2.0 < D45min/fw < 3.5$$

is satisfied, where a focal length of an entire system at the wide angle end is fw, and a minimum value of an interval between the fourth lens unit and the fifth lens unit during zooming from the wide angle end to the telephoto end is D45 min.

9. The zoom lens according to claim 1, wherein a conditional expression, $$0.03 < Dpi/Lt < 0.40$$

is satisfied, where an interval between an exit surface of the reflection unit and the image plane is Dpi, and a total lens length at the telephoto end is Lt.

10. The zoom lens according to claim 1, wherein a conditional expression, $$0.03 < Ymax/|m2| < 0.15$$

is satisfied, where a radius for a maximum effective image diameter among effective image diameters at respective zoom positions formed by the zoom lens is Ymax, and an amount of movement of the second lens unit during zooming from the wide angle end to the telephoto end is m2.

11. The zoom lens according to claim 1, wherein a conditional expression, $$0.02 < -f2/ft < 0.07$$

is satisfied, where a focal length of the second lens unit is f2, and a focal length of an entire system at the telephoto end is ft.

12. The zoom lens according to claim 1, wherein a conditional expression, $$8.0 < f1/fw < 20.0$$

is satisfied, where a focal length of the first lens unit is f1, and a focal length of an entire system at the wide angle end is fw.

13. The zoom lens according to claim 1, wherein a conditional expression, $$20 < \beta 2t/\beta 2w < 70$$

is satisfied, where a transverse magnification of the second lens unit at the wide angle end is β2w, and a transverse magnification of the second lens unit at the telephoto end is β2t.

14. The zoom lens according to claim 1, wherein a conditional expression, $$0.40 < -f4/f5 < 0.95$$

is satisfied, where a focal length of the fourth lens unit is f4, and a focal length of the fifth lens unit is f5.

15. The zoom lens according to claim 1, wherein a conditional expression, $$0.06 < f5/ft < 0.15$$

is satisfied, where a focal length of the fifth lens unit is f5, and a focal length of an entire system at the telephoto end is ft.

16. The zoom lens according to claim 1, wherein the second lens unit includes one or more positive lenses, and a conditional expression, $$10.0 < vd2 < 20.0$$

is satisfied, where an Abbe number for d-line of a material of at least one of the positive lenses is vd2.

17. The zoom lens according to claim 1, wherein an image is formed on a solid image pickup element.

18. An image pickup device, comprising: a zoom lens; and a solid image pickup element that receives an image formed by the zoom lens,
wherein the zoom lens comprises, in order from an object side to an image plane side: a first lens unit having a positive refractive power; a second lens unit having a negative refractive power; a third lens unit having a positive refractive power; a fourth lens unit having a negative refractive power; and a fifth lens unit having a positive refractive power,
at least the second lens unit and the fourth lens unit move during zooming such that at a telephoto end, in comparison with a wide angle end, an interval between the first lens unit and the second lens unit increases, an interval between the second lens unit and the third lens unit decreases, an interval between the third lens unit and the fourth lens unit changes, and an interval between the fourth lens unit and the fifth lens unit increases, and the fifth lens unit does not move, and the zoom lens further comprises a reflection unit for bending a light path, between the fourth lens unit and the fifth lens unit.

\* \* \* \* \*